United States Patent
Weizeorick et al.

(10) Patent No.: US 8,081,639 B2
(45) Date of Patent: Dec. 20, 2011

(54) METHOD AND APPARATUS FOR SUPPORTING CLIENT DATA TRANSPORT WITH TIMING TRANSPARENCY

(75) Inventors: Lawrence D. Weizeorick, Lisle, IL (US); Bruce R. Zelle, Naperville, IL (US); Steven T. DeLong, Woodridge, IL (US)

(73) Assignee: Tellabs Operations, Inc., Naperville, IL (US)

( * ) Notice: Subject to any disclaimer, the term of this patent is extended or adjusted under 35 U.S.C. 154(b) by 333 days.

(21) Appl. No.: 12/583,267

(22) Filed: Aug. 18, 2009

(65) Prior Publication Data

US 2010/0192003 A1 Jul. 29, 2010

Related U.S. Application Data

(60) Provisional application No. 61/206,082, filed on Jan. 27, 2009.

(51) Int. Cl.
*H04L 12/28* (2006.01)
*H04J 3/06* (2006.01)

(52) U.S. Cl. .................... 370/395.62; 370/503

(58) Field of Classification Search .......... None
See application file for complete search history.

(56) References Cited

U.S. PATENT DOCUMENTS

| | | | |
|---|---|---|---|
| 5,396,492 A | 3/1995 | Lien | |
| 5,754,789 A | 5/1998 | Nowatzyk et al. | |
| 6,188,690 B1 | 2/2001 | Holden et al. | |
| 6,724,779 B1 | 4/2004 | Alleyne et al. | |
| 6,959,064 B2* | 10/2005 | Spijker et al. | 375/376 |
| 7,188,928 B2 | 3/2007 | Walmsley et al. | |
| 7,315,539 B2* | 1/2008 | Sund et al. | 370/354 |
| 7,366,270 B2 | 4/2008 | Tang et al. | |
| 2005/0100006 A1* | 5/2005 | Scott et al. | 370/360 |
| 2007/0001722 A1* | 1/2007 | Young et al. | 327/156 |
| 2011/0193970 A1* | 8/2011 | Zhu | 348/180 |

* cited by examiner

*Primary Examiner* — Hong Cho
(74) *Attorney, Agent, or Firm* — Hamilton, Brook, Smith & Reynolds, P.C.

(57) ABSTRACT

Clock recovery is used in a variety of communications network applications to enable nodes using different clocks to operate in an effectively synchronized manner. Example embodiments of the present invention include an apparatus and corresponding method for supporting client data transport with timing transparency and require neither a common clock to be available at both the ingress and egress sides of the connection nor overhead bytes to recover a client clock. Rather, client traffic clock recovery may be performed in example embodiments of the present invention entirely in the egress data path using the client data received from the ingress side after removing the clients signal from a higher level carrier signal.

22 Claims, 18 Drawing Sheets

METHOD AND APPARATUS FOR SUPPORTING CLIENT DATA TRANSPORT WITH TIMING TRANSPARENCY

RELATED APPLICATION

This application claims the benefit of U.S. Provisional Application No. 61/206,082, filed on Jan. 27, 2009, the entire teachings of which are incorporated herein by reference.

BACKGROUND OF THE INVENTION

Clock recovery is used in a variety of communications network applications to enable nodes using different clocks to operate in an effectively synchronized manner. When a client provides a traffic signal (e.g., Ethernet or synchronous optical networking (SONET) signal), a higher-rate signal may transport that client traffic signal from an ingress side of a network using standards such as Generic Frame Protocol (GFP) or Optical Transport Unit (OTU) signals. Certain standards govern the requirements for such higher-rate signals and must be adhered to for reliable data transmission. For example, with regard to SONET, Generic Requirement 253 (GR-253) provides jitter and wander performance requirements. After the higher rate signal traverses the network, the client traffic signal is stripped out of the higher-rate signal at an egress side of the network. The signal may be bursty, such as in the case of Ethernet, and may be susceptible to wander and jitter. However, the client will want to acquire the original frequency at which the client traffic signal arrived at the ingress side.

One existing method uses a differential clock recovery method in which phase information, relative to a clock that is common to both the ingress and egress data path, is included in a traffic signal as overhead and sent from the client ingress side to the client egress side in order to assist the egress side in recovering the client's phase. This method requires a common clock to be available to both the ingress and egress sides of the connection as well as the use of overhead bytes to send the phase information between two network nodes. However, not all systems or network architectures include a reference clock or have a reference clock available, and organizations may prefer not to have to comply with such a requirement or to equip network nodes with complex circuits to support reference clocks and phase corrections thereof.

SUMMARY OF THE INVENTION

Example embodiments of the present invention include an apparatus and corresponding method for supporting client data transport with timing transparency. A memory, such as a First In First Out (FIFO) memory, receives client data contained in a network transport signal. In the case of the apparatus, the apparatus clocks the client data into the memory at a transport timing domain. A clock recovery loop in the apparatus derives a client data reference clock as a function of a depth indicator of client data in the memory, a clock recovery reference clock, and the client data reference clock. The clock recovery loop provides the client data reference clock to the memory to clock out the client data in the recovered client timing domain to transfer the client data from the transport timing domain to a recovered client timing domain to support client data transport with timing transparency.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Example embodiments of the present invention require neither a common clock to be available at both the ingress and egress sides of a connection nor overhead bytes to recover a client clock. Rather, client traffic clock recovery may be performed in example embodiments of the present invention entirely in the egress data path using the client data received from the ingress side.

Figure 1:
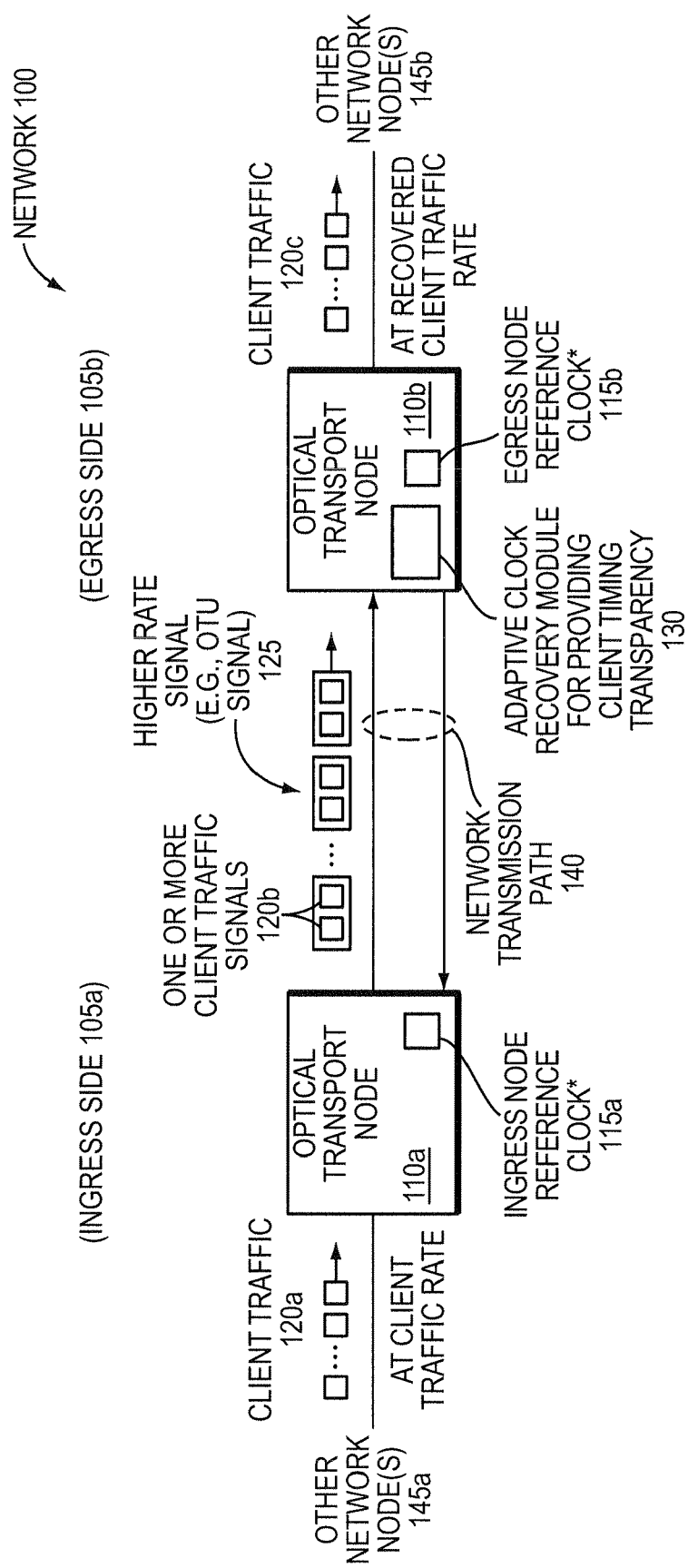
FIG. 1 is a block diagram illustrating an example network in which example embodiments of the present invention may be employed.

FIG. 1 is a block diagram illustrating an example network 100 having an ingress side 105a and an egress side 105b in which example embodiments of the present invention may be employed. The ingress side 105a of the network 100 includes an optical transport node (OTN) 110a having an ingress node reference clock 115a, and the egress side 105b of the network 100 includes an OTN 110b having an egress node reference clock 115b. The respective ingress and egress node reference clocks are not required to be synchronized for client traffic clock recovery.

As client traffic 120a arrives from other network node(s) 145a at the ingress OTN 110a at a client traffic rate, a client clock (not shown) clocks the client traffic 120a into the OTN 110a. The OTN 110a may receive client traffic from multiple clients which are each clocked in to the OTN 110a by their respective client clock. The OTN 110a then transports the clocked-in client traffic over the network 100 via a higher-rate signal 125. The higher-rate signal 125 may be an optical transport unit (OTU) signal encapsulating the client traffic signal(s) representing the client traffic 120b. The OTN 110a clocks the higher-rate signal 125 onto a network transmission path 140 using the ingress node reference clock 115a. Upon arrival at the egress OTN 110b, the client traffic 120a (possibly bursty) in the OTU signal 125 enters an adaptive clock recovery module 130 for providing client timing transparency. As will be described in detail below, the adaptive clock recovery module 130 recovers the client clock at which the client traffic 120a arrived at the ingress OTN 110a. The egress OTN 110b then transmits the client traffic 120c at the client traffic rate to other network node(s) 145b (not shown).

The terms "ingress" and "egress" are used throughout this specification for clarity. However, it should be understood that, depending on one's point of view, both the ingress side 105a and the egress side 105b of the network 100 illustrated in FIG. 1 may support ingress and egress traffic flow, such as in a bidirectional network. Therefore, for example, the egress node reference clock 115b may clock ingress client traffic arriving at the egress OTN 105b at a client traffic rate into the OTU signal 125 for transport over the network 100 and a corresponding adaptive clock recovery module (not shown) at the ingress OTN 110a may clock the client traffic back to the client traffic rate for transport to other network nodes 145a (not shown).

Figure 2:
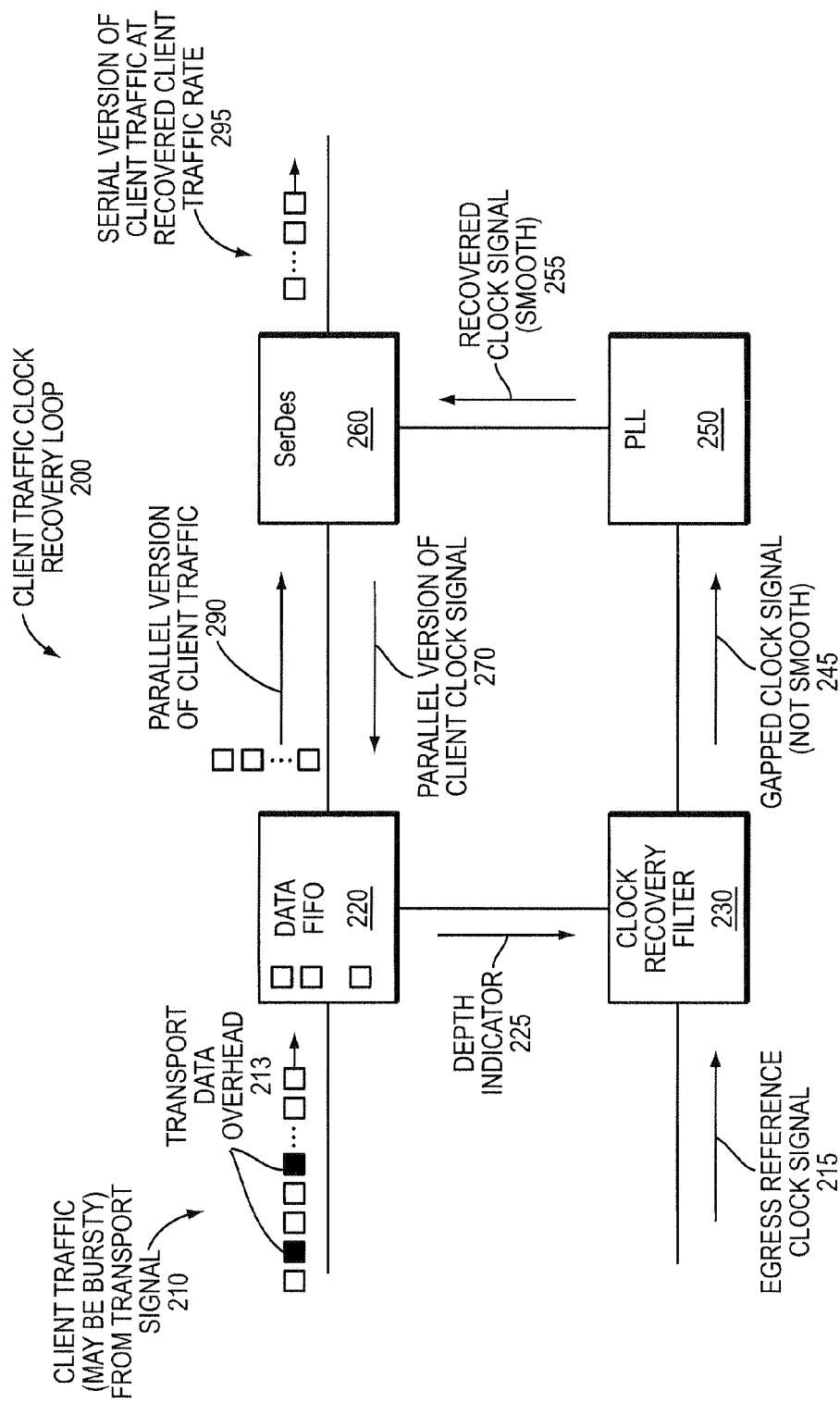
FIG. 2 is a block diagram of an example embodiment of the present invention.

FIG. 2 is a block diagram of an example embodiment client traffic clock recovery loop 200 that may be employed in an adaptive clock recovery module 130 (FIG. 1) for providing client timing transparency. The client traffic clock recovery loop 200 includes memory 220, such as a data First In First Out (FIFO) memory element, a clock recovery filter 230, a phase-locked loop (PLL) 250, and a serializer/deserializer (SerDes) 260. The SerDes 260 may be a S4882 manufactured by Applied Micro Circuits Corporation (AMCC) of Sunnyvale, Calif. The PLL may be a Si5326 manufactured by Silicon Labs (SiLabs) of Austin, Tex. For purposes of illustration, the memory 220 is a data FIFO in this example embodiment. Other forms of memory devices alternatively can be employed.

As described above in reference to the traffic signals 120b and as will be discussed below in greater detail, a carrier clock of the transport signal clocks the client traffic 210 from the transport signal into the data FIFO 220 while a recovered parallel version of the client clock 270 clocks a parallel version of the client traffic 290 out of the data FIFO 220. This allows the bursty client traffic 210 going into the data FIFO 220 to be clocked out of the data FIFO 220 at a smooth, constant rate. Transport data overhead 213 in the client traffic 210 is not clocked into the data FIFO 220.

As client traffic 210 (may be bursty) enters the data FIFO 220, the data FIFO 220 begins to fill. The data FIFO, in turn, produces a data FIFO depth indicator 225 providing a value of how full the data FIFO 220 is at any given time and provides the depth indicator 225 to the clock recovery filter 230. The depth indicator 225 allows the clock recovery filter 230 to determine the client traffic data rate. For example, if the client traffic data rate 210 is higher than the recovered parallel version of client clock signal 270, then the depth indicator 225 indicates that the data FIFO 220 is filling. Conversely, if the client data rate 210 is lower than the parallel version of client clock signal 270, then the depth indicator 225 indicates that the data FIFO 220 is emptying.

The clock recovery filter 230 uses the depth indicator 225 and an egress reference clock (clock recovery reference clock) 215 to produce a gapped clock signal 245 as will be discussed below. For example, a gapped clock signal may be a signal produced by an oscillator at a rate of ten cycles per second and reduced to a rate of nine cycles per second by skipping every tenth cycle. Thus, skipping a cycle in a gapped clock signal causes the clock rate to come down (i.e., what was a rate of ten cycles per second is now, effectively, a rate of nine cycles per second). However, this gapped clock signal is not evenly spaced (i.e., the signal is, effectively, nine cycles at a rate of ten cycles per second followed by one "cycle" of nothing). Therefore, as understood in the art, the PLL 250 averages the gapped clock signal 245 to produce a smooth, recovered clock 255 changing regularly at a frequency set by the gapped clock signal (i.e., nine cycles per second).

The recovered clock signal 255 then passes through the SerDes 260 to generate a parallel version of the client clock signal 270. The data FIFO 220 then uses this parallel version of the client clock signal 270 as an input to clock the client traffic 210 out of the data FIFO 220 as a parallel version of the client traffic 290, through the SerDes 260, and out of the clock recovery loop 200 as a serial version of the client traffic 295 at the client's original recovered data rate.

Figure 3:
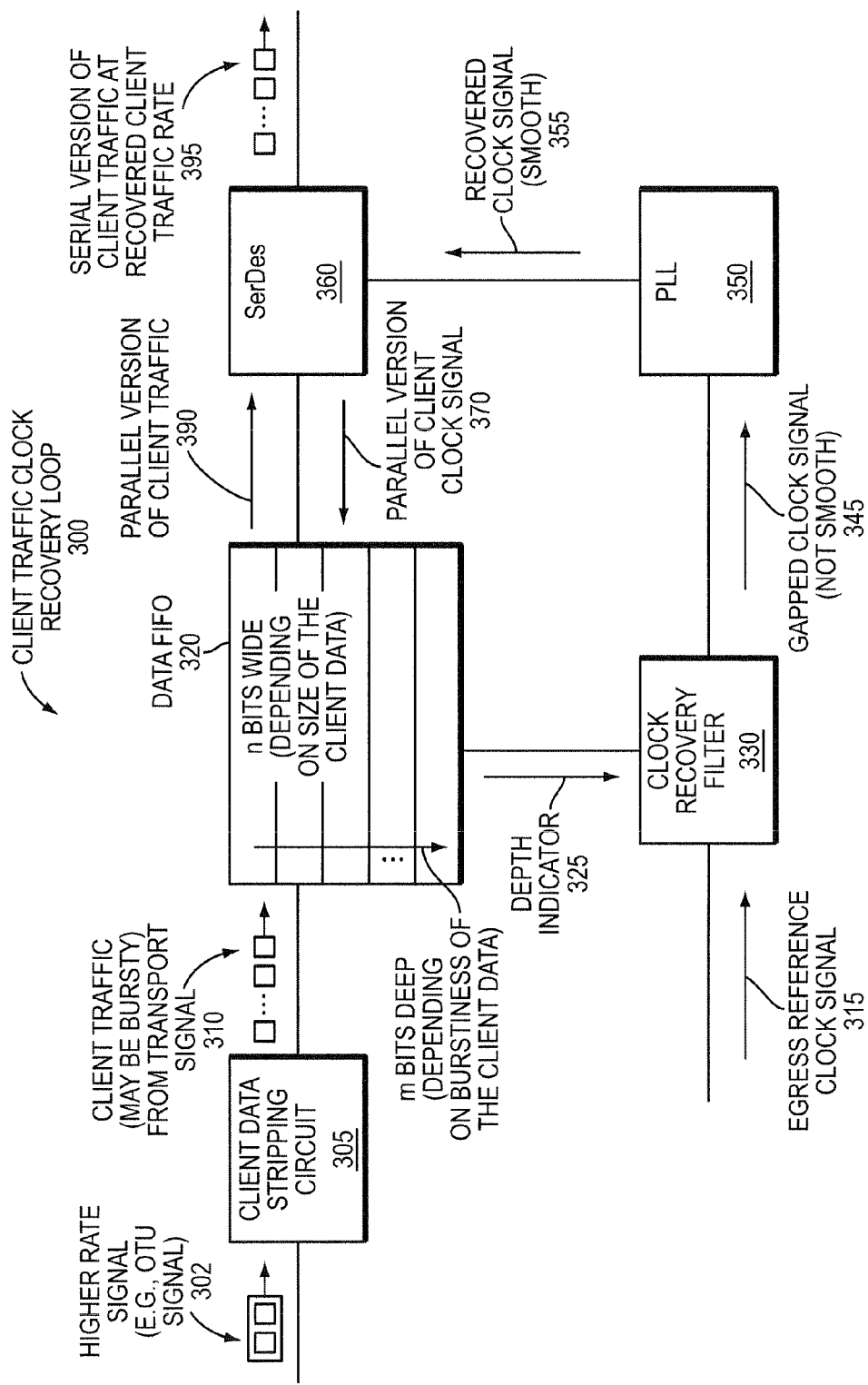
FIG. 3 is a block diagram of an example embodiment of the present invention in greater detail.

FIG. 3 is a block diagram of an example embodiment of a client traffic clock recovery loop 300 in greater detail (e.g., the client traffic clock recovery loop 200 of FIG. 2). The client traffic clock recovery loop 300 includes memory, such as a data FIFO 320, clock recovery filter 330, PLL 350 and SerDes 360. However, before entering the client traffic clock recovery loop 300, for example, a client data stripping circuit 305 strips bursty client traffic 310 from a higher data rate signal (e.g., OTU signal 125 of FIG. 1) (not shown).

As described above, a clock of the higher data rate signal clocks bursty client traffic 310 from the transport signal into the data FIFO 320. In this embodiment, the data FIFO 320 is n bits wide (depending on the size of the client traffic) and m bits deep (depending on the burstiness of the client traffic). A data FIFO depth indicator 325 indicates the depth into the data FIFO at which client data is written at any given time and is updated with each clock cycle; thus the depth indicator 325 varies between 0 and M.

The clock recovery filter 330 accepts the data FIFO depth indicator 325 and the egress reference clock signal (clock recovery reference clock) 315 as inputs to produce a gapped clock signal 345. The PLL 350 then averages the gapped clock signal 345 to provide a recovered clock 355, which is equivalent to the gapped clock signal 345 but smooth (i.e., not bursty) in periodicity. The recovered clock signal 355 then passes through the SerDes 360 to generate a parallel version of the client clock signal 370, which the data FIFO 320 uses to output a parallel version of the client traffic 390 at a smooth rate. The parallel version of the client traffic 390 passes through the SerDes 360 which converts the parallel version of the client traffic 390 to a serial version of the client traffic 395 at the recovered client traffic rate, which exits the client traffic clock recovery loop 300.

Figure 4:
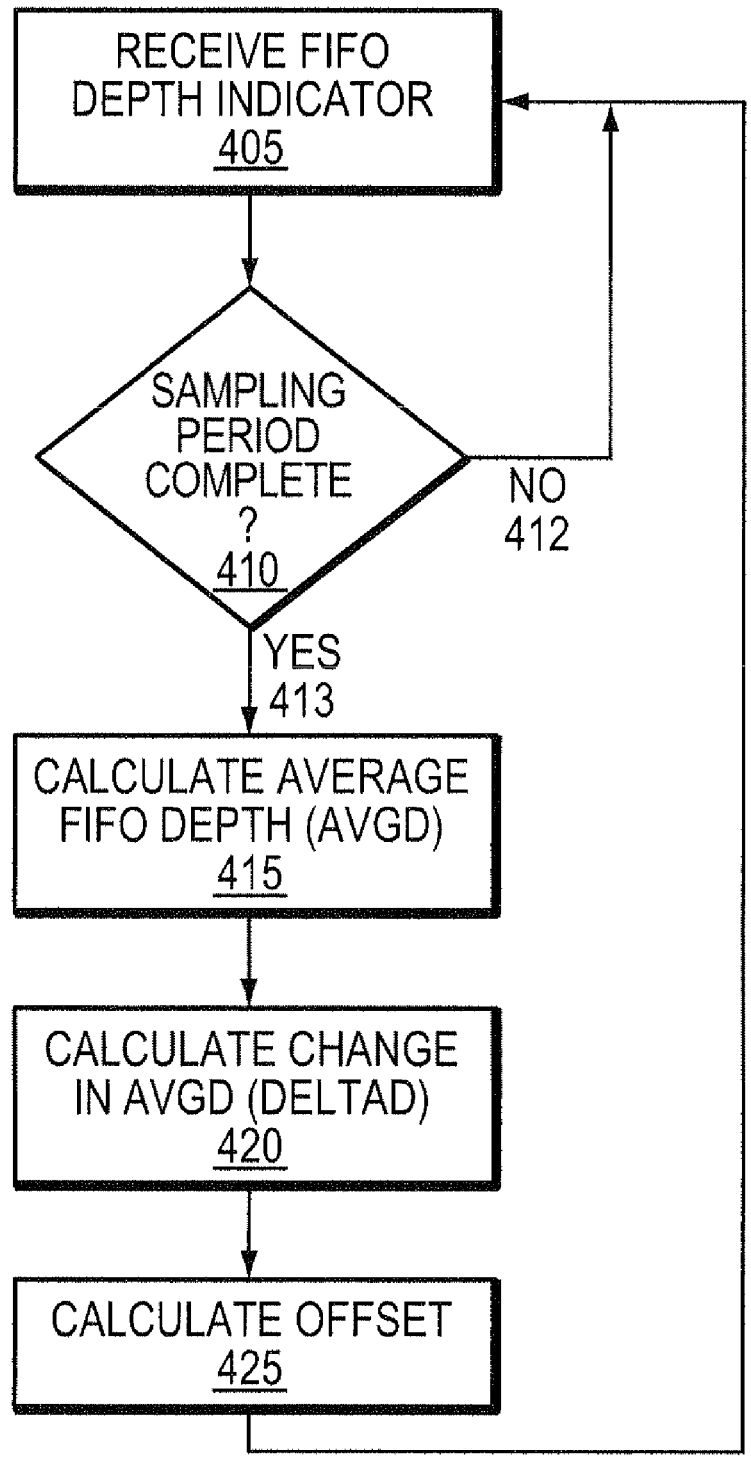
FIG. 4 is a circuit diagram of an example embodiment of the present invention.

FIG. 4 is a flow diagram 400 illustrating an example method by which a clock recovery filter (e.g., the clock recovery filter 330 of FIG. 3) may calculate an OFFSET value to adjust a gapped clock. In this example embodiment, the clock recovery filter receives a FIFO depth indicator for each clock cycle (405) and sums the values over a sampling period (410). If the current sampling period has not yet completed (412), the clock recovery filter continues to receive FIFO depth indicator values (405). If the current sampling period is complete (413), the clock recovery filter uses the summed FIFO depth indicator values to calculate two additional values to determine how to adjust the gapped clock frequency to ultimately arrive at the recovered client data rate: (1) an approximation of the average FIFO depth for a sampling period (avgD) (415); and (2) an approximation of a change in average FIFO depth between sampling periods (deltaD) (420).

The values are calculated according to the following equations.

$$avgD = \frac{\sum_{1}^{N} D_N}{N} \quad (415):$$

The average FIFO depth for the current sampling period, where $D_N$ is the $N^{th}$ FIFO depth indicator value over a sampling period normalized from the center value of the FIFO. For example, for a FIFO having 512 words and a sampling period of 1 cycle, a FIFO depth indicator value of 256 will yield an avgD of 0 (i.e., (512/2)−256) and a FIFO depth indicator value of 250 will yield an avgD of 6 (i.e., (512/2)−250).

deltaD=avgD−avgD_prev (420): The change in average FIFO depth between the current sampling period and the previous sampling period, where avgD_prev is the average FIFO depth for the previous sampling period. The change in average FIFO depth is measured in words, with a change in depth of one word caused by one extra or one less input clock cycle (client data stripped from transport signal) relative to the output clock cycle (recovered client clock). The change in average FIFO depth gives an indication of how far off the recovered clock is from the client traffic clock. For example, if the data FIFO is filling (as indicated by a positive value for deltaD), the recovered clock is too slow and needs to be sped up. Conversely, if the data FIFO is emptying (as indicated by a negative value for deltaD), the recovered clock is too fast and must be slowed down.

Based on these calculated values of average FIFO depth (avgD) (415) and change in average FIFO depth (deltaD) (420), an OFFSET value may be calculated (425) to adjust the gapped clock (up or down), as will be discussed below. After each sampling period, the OFFSET value is updated using the following equation.

$$OFFSET = \frac{OFFSET\_DELTA + OFFSET\_DEPTH}{S};$$

The difference between the clock recovery reference clock and the gapped clock calculated by the clock recovery filter. The OFFSET is measured in words per million words, or parts per million (ppm).

The various parts of this equation are discussed in detail below.

$$OFFSET\_DELTA = OFFSET\_DELTA\_PREV + \frac{deltaD + \frac{avgD\_prev}{DepthPct}}{DeltaPct};$$

The change in average FIFO depth in words caused by fewer or more input clock cycles (client clock) relative to the output clock (recovered clock). For example, a change in average FIFO depth (deltaD) of 1 word may be caused by one extra or one less input clock cycle (client data stripped from the transport signal) relative to the output clock. OFFSET_DELTA_PREV is the OFFSET_DELTA value for the previous sampling period.

$$\frac{avgD\_prev}{DepthPct};$$

A scaled value of the average FIFO depth movement from the previous sampling period caused in order to move the FIFO toward center. The average FIFO depth for the previous sampling period (avgD_prev) is used because the previous average FIFO depth will cause a FIFO movement during the current sampling period. The average FIFO depth of the previous sampling period (avgD_prev) is scaled by DepthPct to control the amount it contributes to changing the current OFFSET for each sampling period.

$$\frac{deltaD + \frac{avgD\_prev}{DepthPct}}{DeltaPct};$$

The resultant change in average FIFO depth for the current sampling period caused by the difference between the clock recovery reference clock and the recovered client traffic clock. The previous change in average FIFO depth should be removed when calculating the portion of deltaD that is caused by the difference in the recovered client clock for the current sampling period versus the recovered client traffic clock. Thus, adding it to deltaD in the equation for OFFSET_DELTA removes it because the FIFO will move in the inverse direction of avgD_prev. The resultant change in average FIFO depth is scaled by DeltaPct to control the amount it contributes to changing the current OFFSET for each sampling period.

Although not required or essential to determine the recovered client traffic clock, it is useful to have the average FIFO depth (avgD) at the center of the data FIFO (i.e., M/2) (e.g., at a value of 2,000 for a data FIFO with a depth of 4,000). However, the average FIFO depth indicator can be off center (i.e., above or below 2,000) and not moving, thus indicating an accurate recovered client traffic clock for the current sampling period. Therefore, it may be useful to manipulate the recovered client traffic clock to move the average FIFO depth (avgD) to the center FIFO depth (i.e., M/2) (e.g., from a value of 3,000 to 2,000) to reduce a risk of FIFO underflow or overflow. This may be accomplished by changing the recovered client traffic clock for the current sampling period to drive the average FIFO depth (avgD) to center over a long period of time.

Such a deliberate change to the recovered client traffic clock causes a change in the average FIFO depth (avgD) (i.e., 3,000 to 2,000); but, in this case, the change is not the result of a change in the client traffic rate, so it can be ignored in measuring both the next change in average FIFO depth (deltaD) and the recovered client traffic clock. Therefore, the manipulated change in average FIFO depth (i.e., internal effect) of the previous sampling period is subtracted out in measuring the change in average FIFO depth for the current sampling period to determine the true change in average FIFO depth caused by any variability of the client traffic clock (i.e., external effect). Thus, in this case, the clock recovery filter 330 determines the output gapped clock frequency solely based on the change in the average FIFO depth (deltaD) over the sampling period and modifies the gapped clock frequency for each sampling period based on the average FIFO depth (avgD) in order to move the FIFO depth indicator 425 toward center (i.e., M/2). This way, an offset generated in order to center the average FIFO depth does not contribute to the change in average FIFO depth calculation.

Note that, in the equations above, OFFSET_DEPTH does not add the previous value of OFFSET_DEPTH to the current value, unlike the OFFSET_DELTA equation (i.e., OFFSET_DELTA_PREV). This prevents the average FIFO depth (avgD) from contributing to the running total of OFFSET_DEPTH and allows the change in average FIFO depth (deltaD) to contribute to the running total of OFFSET_DEPTH. This way the clock recovery filter determines the client traffic clock using the change in average FIFO depth (deltaD) and then modifies it each sampling period based on the average FIFO depth measured in the previous sample period (avgD_prev) in order to drive the FIFO depth indicator value toward center. This prevents oscillation in the output rate caused by the average FIFO depth.

DepthPct and DeltaPct: Empirical values depending on the current mode of the clock recovery filter, as discussed below. For example, in a lock mode the values are higher to prevent the OFFSET value from changing as quickly as it can in acquire mode where DepthPct and DeltaPct are lower. Therefore, for example, a DepthPct value of 2 reduces the contributions of avgD and avgD_prev to fifty percent and a DepthPct value of 4 reduces the contributions of avgD and avgD_prev to twenty-five percent.

$$\text{OFFSET\_DEPTH} = \frac{avgD}{DepthPct};$$

A scaled value of the average FIFO depth in words. The average FIFO depth (avgD) is scaled by DepthPct to control the amount it contributes to changing the current OFFSET for each sampling period.

S=N×R: A scaling factor in millions of cycles (or words since there is one word per cycle) for the OFFSET value determined by the sampling period (N) and the desired resolution (R) of the clock recovery filter. The sampling period determines how the calculated OFFSET value equates to actual ppm. As understood in the art, a PLL has a certain reaction time. For example, a PLL may have a reaction time of 10 milliseconds (ms). Thus, it may be advantageous to not update values faster than that reaction time. Therefore, the value of S helps drive timely PLL updates.

In order to calculate the difference between the input client traffic clock and the clock recovery reference clock in ppm using the calculated OFFSET value above, the change in average FIFO depth (deltaD) may be used, ignoring the current depth value. For example, for a FIFO depth movement of deltaD words after N words have been clocked out of the FIFO during the current sampling period, deltaD will be zero if the recovered client clock is matched to the actual input client clock; likewise, deltaD will be non-zero if the recovered client clock is offset from the input client clock. Thus, the OFFSET is calculated in ppm by dividing the change in average FIFO depth for the current sampling period (i.e., deltaD) in words by S (i.e., dividing by the sampling period (N) in words and multiplying by 1 million). Therefore, the OFFSET in ppm is $$OFFSET_{ppm} = \frac{deltaD}{S} = \frac{deltaD}{N \times R} = \frac{deltaD}{N} \times 1,000,000.$$

However, a desired resolution for $OFFSET_{ppm}$ is 0.01 ppm which allows the recovered clock frequency to be within 0.01 ppm of the desired frequency at any given time. This may be attained by multiplying by 100,000,000 instead of 1,000,000. Therefore, $$OFFSET_{0.01ppm} = \frac{deltaD}{N} \times 100,000,000.$$

Further, for implementation purposes, it is generally beneficial to perform multiplications by powers of 2 (e.g., $2^8$ or 256) which can be implemented as a shift instead of a multiplication, as understood in the art. This allows the clock recovery filter 330 to meet the demands of timing by keeping it smaller and simpler, and allows the clock recovery filter 330 to run at higher frequency. Similarly, it may be advantageous for the sampling period to be implemented as a power of 2. Therefore, $$N = B \times P,$$

where B is an integer value of a base sampling period in cycles and P is a power of 2 integer value of the number of base sampling periods used.

In order to restrict P to powers of 2, $$P = 2^{SAMPLE\_SEL},$$

where SAMPLE_SEL, as will be discussed further below, is an integer value depending on the current mode of operation of the clock recovery filter 330.

Therefore, $$OFFSET_{0.01ppm} = \frac{deltaD}{B \times P} \times 100,000,000$$

-continued $$= \frac{deltaD}{B \times 2^{SAMPLE\_SEL}} \times 100,000,000.$$

For example, a base sampling period (B) may be chosen in this example embodiment to be 390,625 (100,000,000/256) cycles. It should be understood that other values, such as other powers of 2, may be used in other embodiments. The sampling period (N) is a power of 2 multiple of the base sampling period (B), thereby allowing for simple computations. Thus, for a base sampling period of 390, 625, $$OFFSET_{0.01ppm} = \frac{deltaD}{390,625 \times 2^{SAMPLE\_SEL}} \times 100,000,000$$

$$= \frac{deltaD \times 256}{2^{SAMPLE\_SEL}},$$

and $$S = \frac{2^{SAMPLE\_SEL}}{256}.$$

A higher sampling time N provides greater accuracy (resolution) in the measurement. Thus, as the output frequency approaches the desired frequency during changes in operational modes, as will be discussed below, the sampling period (as determined by SAMPLE_SEL) is increased to improve the measurement accuracy accordingly. Therefore, the change in average FIFO depth (deltaD) is scaled by the number of sampling periods. Larger sampling periods result in a more accurate measurement of the change in FIFO depth over time but also slow down the responsiveness of the clock recovery filter.

Figure 5:
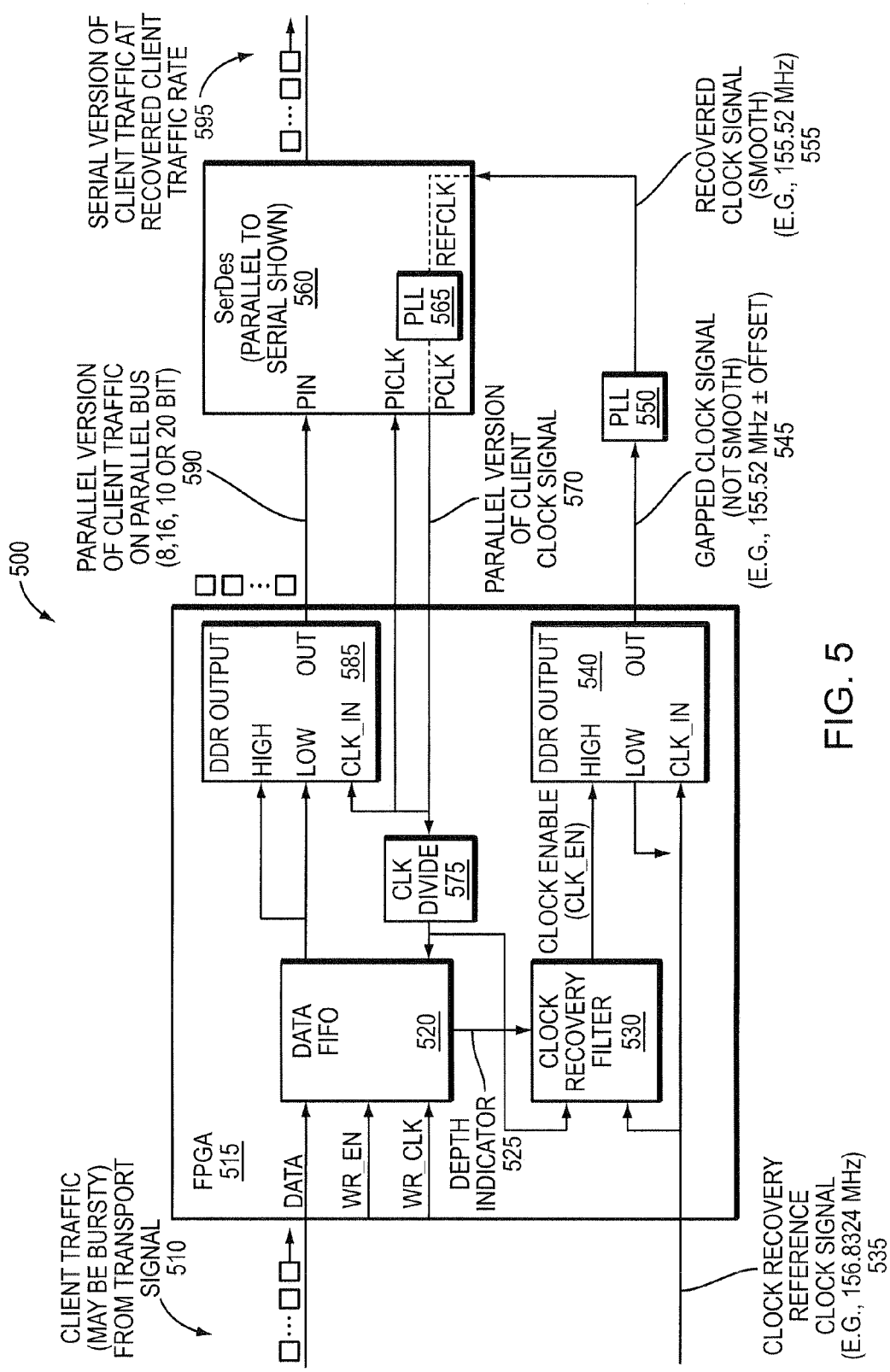
FIG. 5 is a flow diagram illustrating an example method by which the client traffic clock may be recovered.

FIG. 5 is a detailed circuit diagram of another example embodiment of a client traffic clock recovery loop 500. In this example embodiment, the client traffic clock recovery loop 500 includes a Field-Programmable Gate Array (FPGA) 515, PLL 550, and SerDes 560. In other example embodiments, an Application-Specific Integrated Circuit (ASIC) or other circuitry or device may be used in place of the FPGA 515. The FPGA 515 includes a data FIFO 520, a clock recovery filter 530, first double data rate (DDR) device 540 to output a gapped clock 545, clock divider, 575 and second DDR device 585 to output a parallel version of the client traffic on a parallel bus 590.

Bursty client traffic 510 is stripped (e.g., by client data stripping circuit 305 of FIG. 3) (not shown) from a higher data rate transport signal (e.g., OTU signal 125 of FIG. 1) (not shown) and written to the data FIFO 520 along the DATA line, clocked by the carrier clock for the client traffic (e.g., Optical Demultiplexing Unit 2 (ODU2), Ethernet, etc.). A depth indicator 525 is generated by the data FIFO 520 during each clock cycle indicating the depth of the client traffic written to the data FIFO 520 at any given time. The client traffic clock recovery loop 500 accepts the FIFO depth indicator 525 as input, along with a clock recovery reference clock 535 (e.g., the egress node reference clock 115b of FIG. 1) to generate a gapped clock.

International Telecommunications Union Telecommunication Standardization Sector (ITU-T) Recommendation G.709, entitled "Interfaces for the Optical Transport Network (OTN)," defines clock cycle ratios for signals. For example, a ratio of 237/239 defines a transition from an example clock recovery reference clock (carrier clock) 535 of 156.8324 MHz (ODU2 clock frequency) to a nominal recovered clock (client traffic clock) 545 of 155.52 MHz (i.e., Optical Carrier Level 48 (OC48)).

As determined by the clock recovery filter 530, to transition from a clock of 156.8324 MHz to a clock of 155.52 MHz, the clock recovery reference clock 535 is held low twice every 239 cycles or once per 119.5 cycles. First, a counter using the clock recovery reference clock 535 of 156.8324 MHz counts from 1 to 100,000,000 in increments of 836,820 (i.e., (100,000,000/119.5=836,820). A value of 100,000,000 is used to yield a resolution of 0.01 ppm because, as will be discussed below, skipping an additional clock cycle in 100,000,000 cycles results in an OFFSET of approximately 1 in 100,000,000 or 0.01 ppm. Therefore the counter overflows once every 119.5 clock cycles. This yields 119 output cycles for every 119.5 input cycles because a clock cycle is skipped each time the counter overflows.

Each time the counter overflows, an output pulse is passed from the clock recovery filter 530 along the clock enable line (CLK_EN) to the first DDR device 540 to output the gapped clock 545. The DDR device 540 also takes the clock recovery reference clock 535 as an input and holds the clock recovery reference clock 535 low for one cycle for each pulse on the clock enable line from the clock recovery filter 530. The output of the first DDR device 540 is the gapped clock 545. Therefore, the outgoing frequency is 155.52 MHz $$\left(156.8324 \text{ MHz} \times \frac{237}{239} = 155.52 \text{ MHz}\right).$$

Similarly, the calculated OFFSET value may be used by the clock recovery filter 530 to generate a clock that is the nominal rate of 155.52 MHz plus the OFFSET rate.

An example calculation of OFFSET and it's application to generate a gapped clock is set out below.

For example, for a data FIFO 520 having 512 words, a first average FIFO depth (avgD_prev) value for a first (previous) sampling period may be 74, normalized from a depth value of 330 words (i.e., 330-256=74), and a second average FIFO depth (avgD) value for a second (current) sampling period may be 60, normalized from a depth value of 316 words (i.e., 316-256=60). This yields a change in average FIFO depth (deltaD) of −14 (i.e., 60-74=−14). Using the above equations and assuming DepthPct=2, DeltaPct=4, OFFSET_DELTA_PREV=0, and SAMPLE_SEL=1, $$OFFSET\_DELTA = 0 + \frac{-14 + \frac{74}{2}}{4} = 5.75;$$

$$OFFSET\_DEPTH = \frac{60}{2} = 30; \text{ and}$$

$$OFFSET = \frac{5.75 + 30}{\frac{2^1}{256}} = 4,576.$$

An OFFSET value of 4,576 increases the current output frequency. This will cause the data FIFO 520 to empty faster and drive the depth indicator values 525 lower (i.e., toward the data FIFO center value of 256).

By adding the desired ppm OFFSET value to the increment amount (e.g., 836,820), an OFFSET value of 4,576 yields an increment amount of 841,396. This increased increment amount adjusts the output frequency of the clock recovery reference clock 535 by approximately 45.76 ppm. With the OFFSET value of 4,576, the clock recovery filter 530 gaps the reference clock 535 once every 118.85 clock cycles (100,000,000/841,396=118.85) to generate a gapped clock 545. This gapped clock is slightly faster than the reference clock gapped once every 119.5 cycles (100,000,000/836,820=119.5) as would be the case for an OFFSET of 0. Gapping the reference clock of 156.8324 MHz once every 118.85 clock cycles yields a gapped clock frequency 545 of $$156.8324 \times \frac{117.85}{118.85} = 155.5128,$$

which is less than the nominal recovered clock.

The gapped clock 545 is then passed through the PLL 550 to produce a smooth recovered clock 555 changing regularly at a frequency set by the gapped clock 545. This recovered clock 555 may not be at the client traffic rate, so it passes through the SerDes 560, which may include a PLL of its own 565, to generate a parallel version of the client clock 570. The parallel version of the client clock 570 then passes through the clock divider 575 to the data FIFO 520 so the data FIFO 520 may output 580 the client traffic, through the second DDR device 585, as a parallel version of the client traffic 590 over a parallel bus (e.g., having 8, 16, 10 or 20 bits). The SerDes 560 then receives the parallel version of the client traffic 590 and performs a function of fixed scaling to produce a serial version of the client traffic at the client traffic rate 595.

One problem with a fixed sampling period, average depth scale factor (DepthPct) and change in average depth scale factor (DeltaPct) is that, if values are chosen to achieve a quick lock time, the lock frequency will have a large drift range. However, if values are chosen to achieve a small drift range in the output locked frequency, the lock time will be very large.

Figure 6:
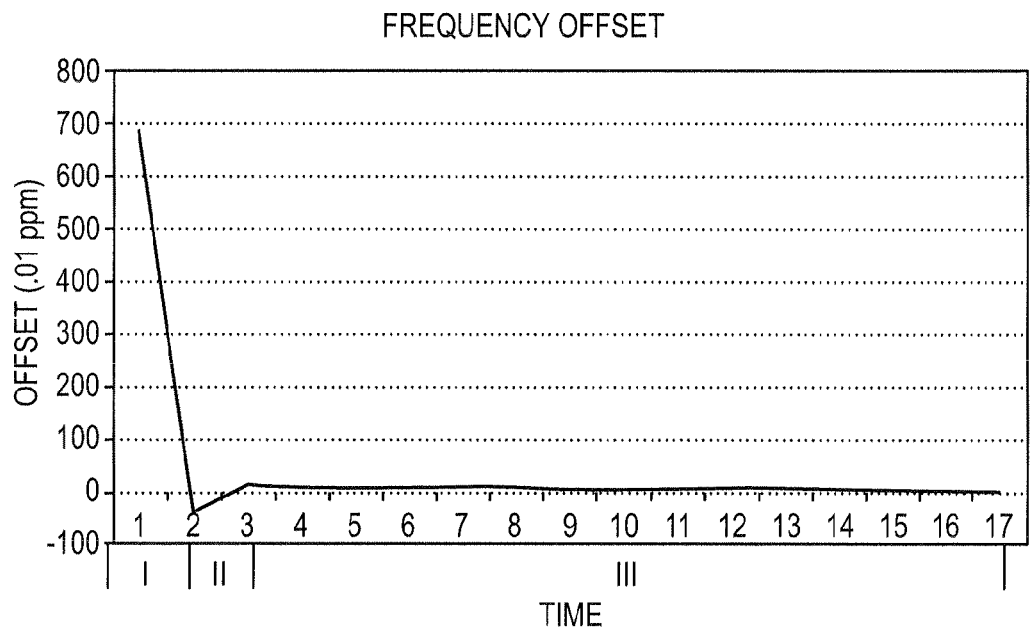
FIG. 6 is a plot illustrating frequency offset over time of first acquire, second acquire and lock modes of operation of example embodiments of the present invention.

FIG. 6 illustrates multiple modes that may be used by the clock recovery filter to avoid these problems using three programmable sets of parameters to allow the reaction time of the clock recovery filter to be programmable. These modes will be referred to as first acquire, second acquire and lock modes.

The clock recovery filter transitions between the modes when values of deltaD and avgD cross programmable thresholds. When transitioning from first acquire mode to second acquire mode, both the delatD and avgD values go below their respective programmed threshold values, deltaD_II_in and avgD_II_in. When transitioning from second acquire mode to lock mode, both the deltaD and avgD values go below their respective programmed threshold valuess deltaD_III_in and avgD_III_in. When transitioning from second acquire mode to first acquire mode, either delatD or avgD goes above the respective programmed thresholds deltaD_II_out and avgD_I_out. When transitioning from lock mode to second acquire mode, either delatD or avgD goes above the respective programmed thresholds deltaD_III_out and avgD_III_out.

The plot of FIG. 6 shows the client data rate OFFSET in ppm over time in seconds during the acquisition of the recovered client traffic rate. Periods of operation under three modes, first acquire, second acquire, and lock, are shown in times I, II and III, respectively. The values used for DepthPct, DeltaPct and SAMPLE_SEL are as follows:

|  | DepthPct | DeltaPct | SAMPLE_SEL |
|---|---|---|---|
| First acquire | 6 | 6 | 7 |
| Second acquire | 6 | 4 | 6 |
| Lock | 1 | 1 | 5 |

The programmable empirical thresholds used are as follows:
deltaD_II_in=8;
avgD_II in=8;
delatD_III_in=32;
avgD_III_in=32;
deltaD_III_out=512;
avgD_II_out=512;
delatD_II_out=512; and
avgD_III_out=512.
It should be understood that different value may be used in different embodiments.

During the first acquire mode (I) from 0 seconds to approximately 1.5 seconds, with the plot starting at 0.5 seconds, the clock recovery filter uses a first set of parameters to determine the recovered client traffic rate. During the first acquire mode (I), it is useful for the clock recovery filter to react quickly with high bandwidth for a quick acquisition time because the recovered client traffic rate for the current sampling period can be far off from the actual client traffic rate. Thus, in the first acquire mode (I), a short sampling period is useful so the clock recovery filter may react quickly to calculate the recovered client traffic clock.

The recovered client traffic rate between sampling periods can change very quickly, thus preventing compliance with wander and jitter requirements. However, once the recovered client traffic rate for the current sampling period gets close to the actual client traffic rate, it becomes less preferable to react quickly. Rather, as the recovered client traffic rate gets closer, a longer sampling period is preferable so the clock recovery filter does not react as quickly to filter out instantaneous movements in depth. Thus, a medium bandwidth mode with slower reaction times is useful to achieve a stable output and meet wander and jitter requirements. This is referred to as the second acquire mode (II) shown from approximately 1.5 seconds to approximately 2.5 seconds.

However, if the parameters for the first acquire mode (I) are very different from those for the second acquire mode (II), and if the recovered client traffic rate for the current sampling period does not get close enough to the actual client traffic rate during the first acquire mode (I) before transitioning to the second acquire mode (II), the clock recovery filter transitions back into the first acquire mode (I). Thus, the clock recovery filter risks never staying in the second acquire mode (II). Therefore, the parameters for the second acquire mode (II) are chosen to cause the clock recovery filter to react slower than in the first acquire mode (I) yet prevent such oscillation between the first acquire mode (I) and the second acquire mode (II).

A third mode, lock mode (III), shown from approximately 3.5 seconds to approximately 16.5 seconds, is used to lock down the recovered client traffic rate further. During this lower bandwidth mode, the parameters are chosen so the clock recovery filter responds very slowly to changes in FIFO depth in order to reduce jitter and wander. The clock recovery filter is considered "locked" when the average FIFO depth and change in average FIFO depth are both below programmable threshold values. The clock recovery filter is considered "out of lock" at times either the average FIFO depth (avgD) or the change in average FIFO depth (deltaD) are above the respective threshold value (i.e., while in first acquire (I) or second acquire (II) mode). Further, the data FIFO logic is designed so that the data FIFO does not overflow or underflow but simply stays at full or empty while the recovered client traffic clock is manipulated to center the FIFO depth indicator. This may be accomplished by blocking data writes when the data FIFO is full and blocking data reads when the data FIFO is empty.

Figure 7:
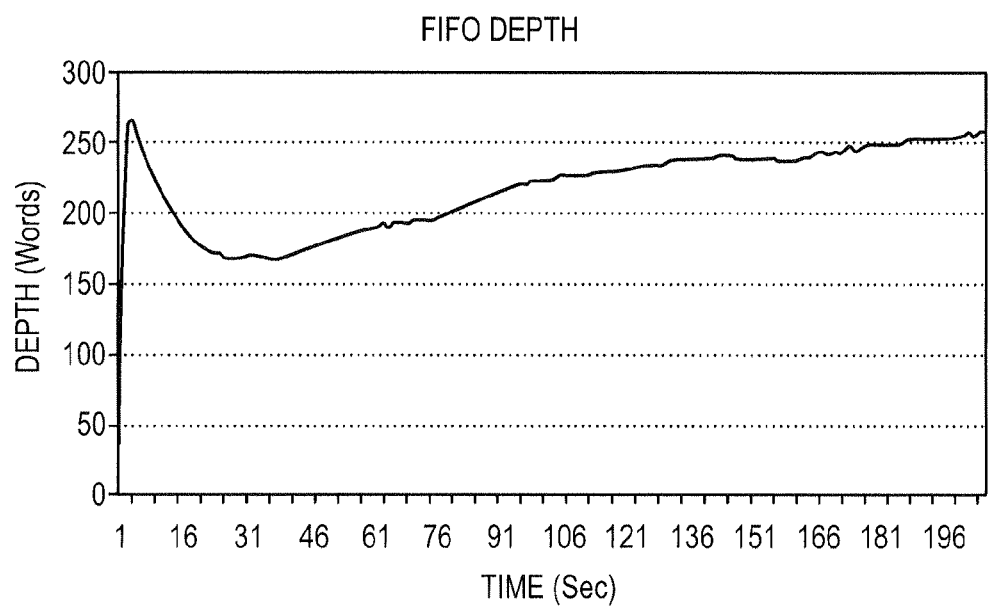
FIG. 7 is a plot showing convergence over time of an average memory (e.g., FIFO) depth value to a memory center value in example embodiments of the present invention.

FIG. 7 is a plot of FIFO depth versus time while the clock recovery filter determines the recovered client traffic rate. In this example plot, the FIFO center value is 256 words for a FIFO of 512 words. The timescale of the plot in FIG. 7 is much longer than that of the plot in FIG. 6 to illustrate that the clock recovery filter eventually brings the average FIFO depth to the center value of the FIFO while determining the recovered client traffic rate. Similar to the plot FIG. 6 as described above, the plot of FIG. 7 also transitions to lock mode (III) in 3 seconds.

FIGS. 8-19 are plots of wander generated by a simulated example embodiment of the present invention for various wander inputs.

Figure 8A:
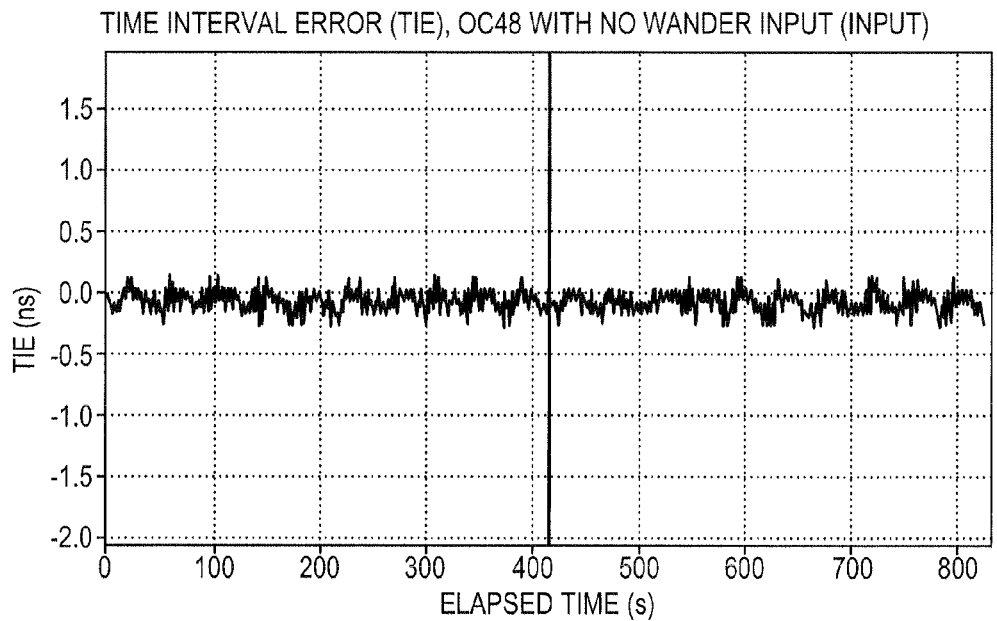
FIGS. 8A-8B are plots of Time Interval Error (TIE) for an Optical Carrier 48 (OC48) signal having virtually no wander accepted as an input and generated as an output by an example embodiment of the present invention, respectively.
Figure 8B:
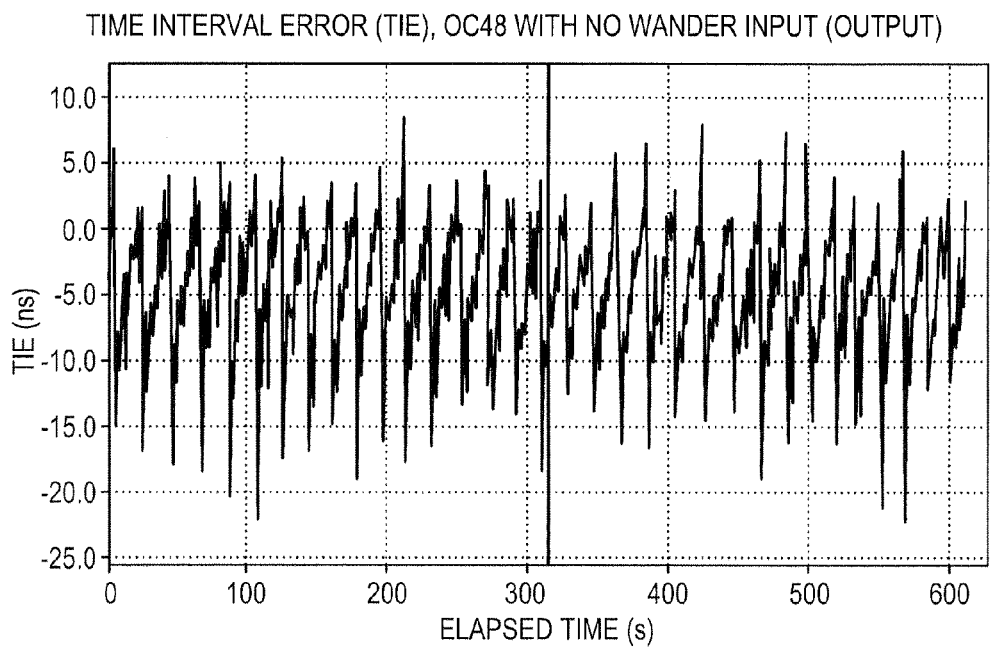
Figure 9A:
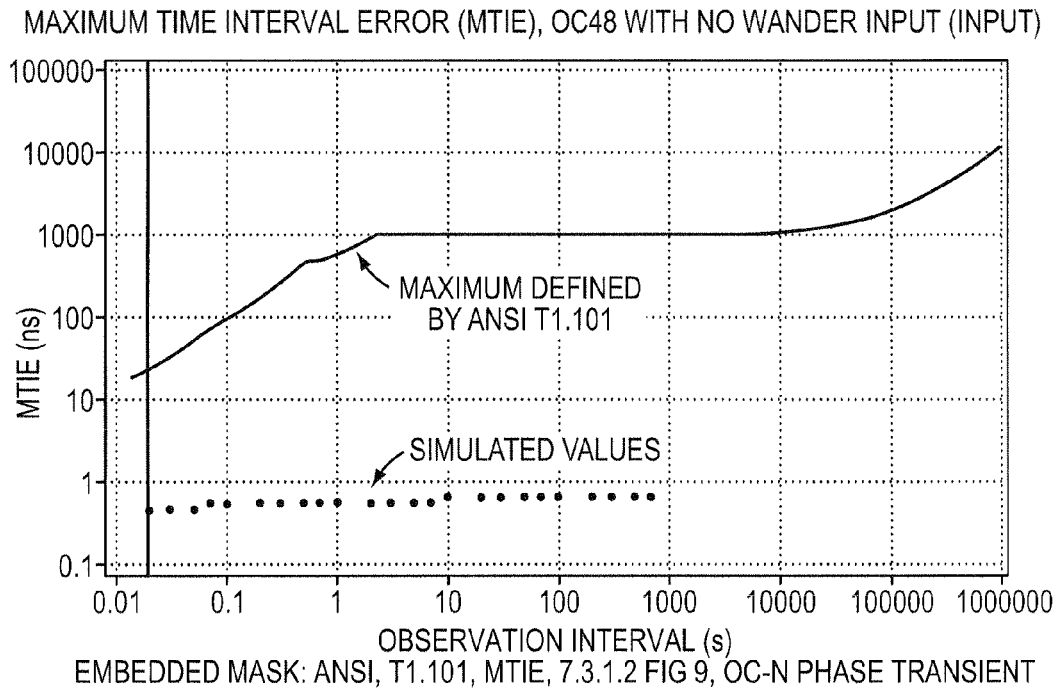
FIGS. 9A-9B are plots of Maximum Time Interval Error (MTIE) for an OC48 signal having virtually no wander accepted as an input and generated as an output by an example embodiment of the present invention, respectively.
Figure 9B:
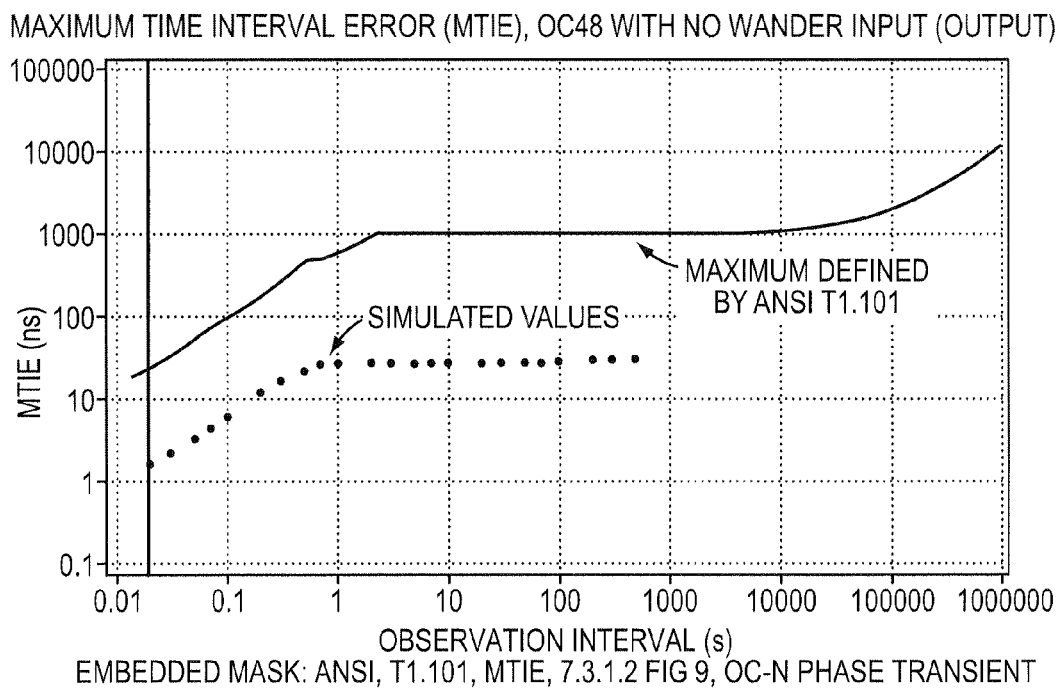
Figure 10A:
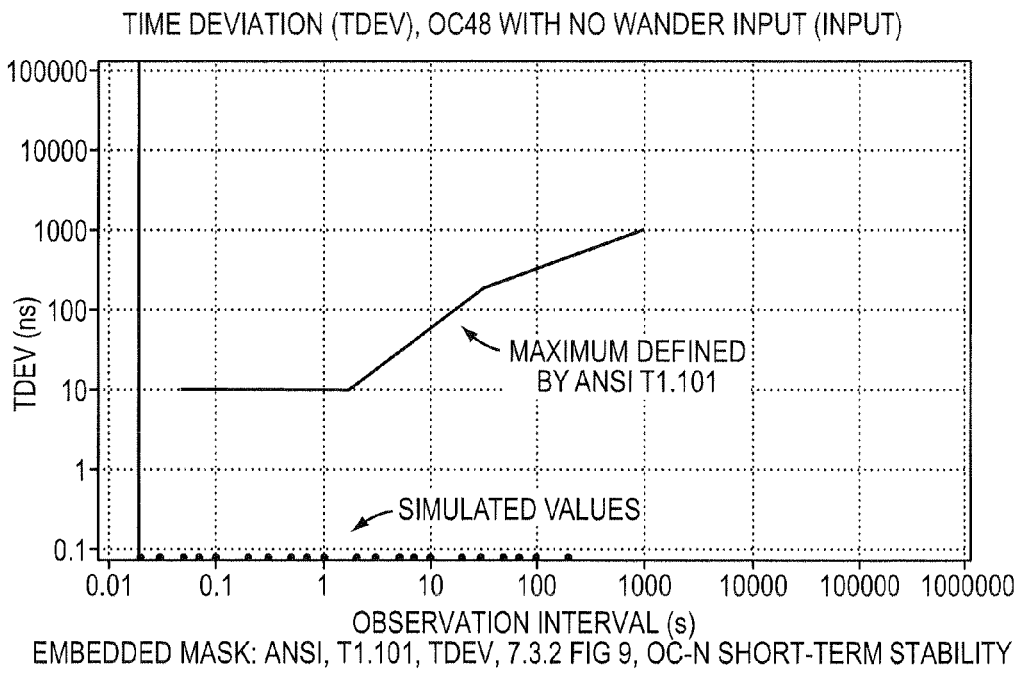
FIGS. 10A-10B are plots of Time Deviation (TDEV) for an OC48 signal having virtually no wander accepted as an input and generated as an output by an example embodiment of the present invention, respectively.
Figure 10B:
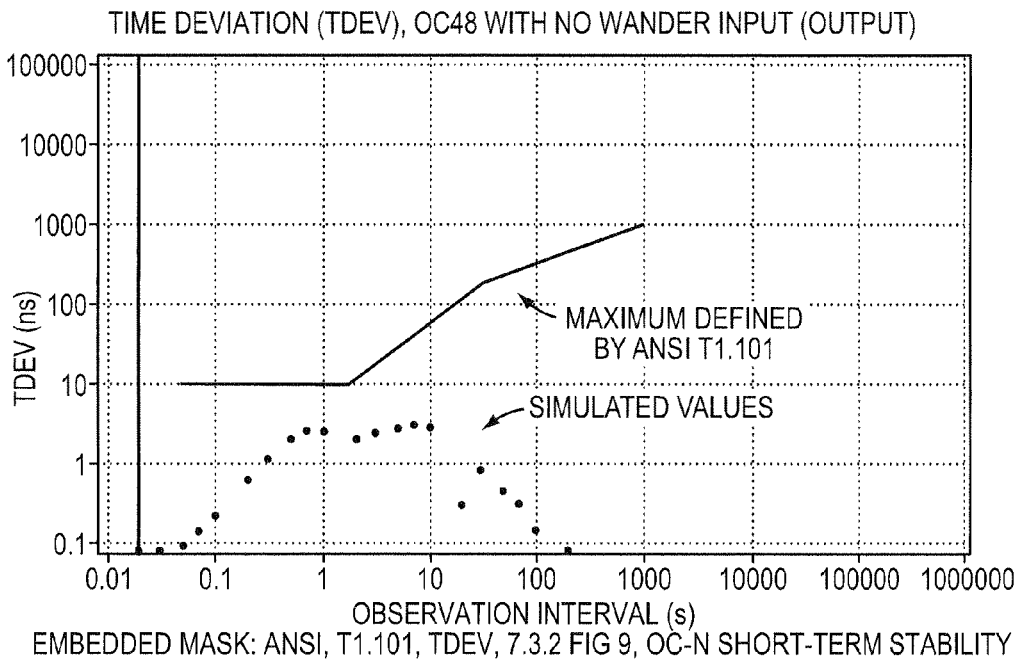

FIGS. 8A, 9A and 10A are plots of Time Interval Error (TIE), Maximum Time Interval Error (MTIE) and Time Deviation (TDEV) as defined by the American National Standards Institute (ANSI) standard entitled "Synchronization Interface Standards for Digital Networks" (ANSI T1.101), respectively, for an Optical Carrier 48 (OC48) signal having virtually no wander accepted as an input by an example embodiment of the present invention. FIGS. 8B, 9B and 10B are corresponding plots of TIE, MTIE and TDEV respectively, generated as an output by the example embodiment of the present invention. The solid lines in the MTIE and TDEV plots illustrate threshold values specified by ANSI T1.101 (actual values must be below these values), while the dots illustrate simulated values generated by the example embodiment of the present invention.

Figure 11A:
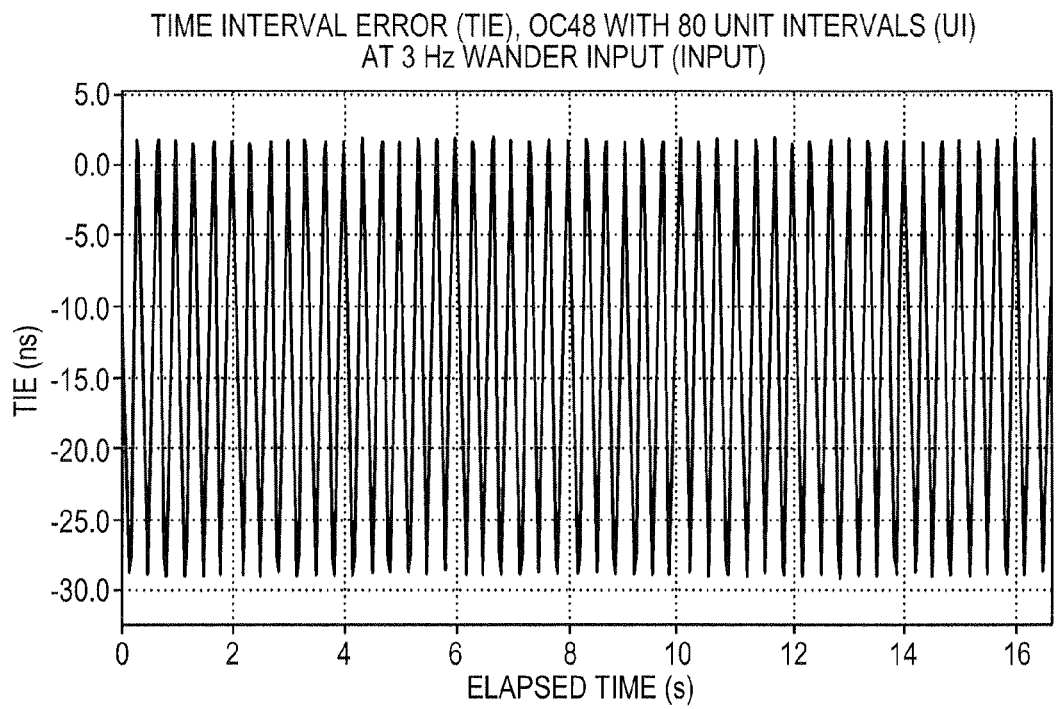
FIGS. 11A-11B are plots of TIE for an OC48 signal having 80 Unit Intervals (UI) of wander at 3 Hz accepted as an input and generated as an output by an example embodiment of the present invention, respectively.
Figure 11B:
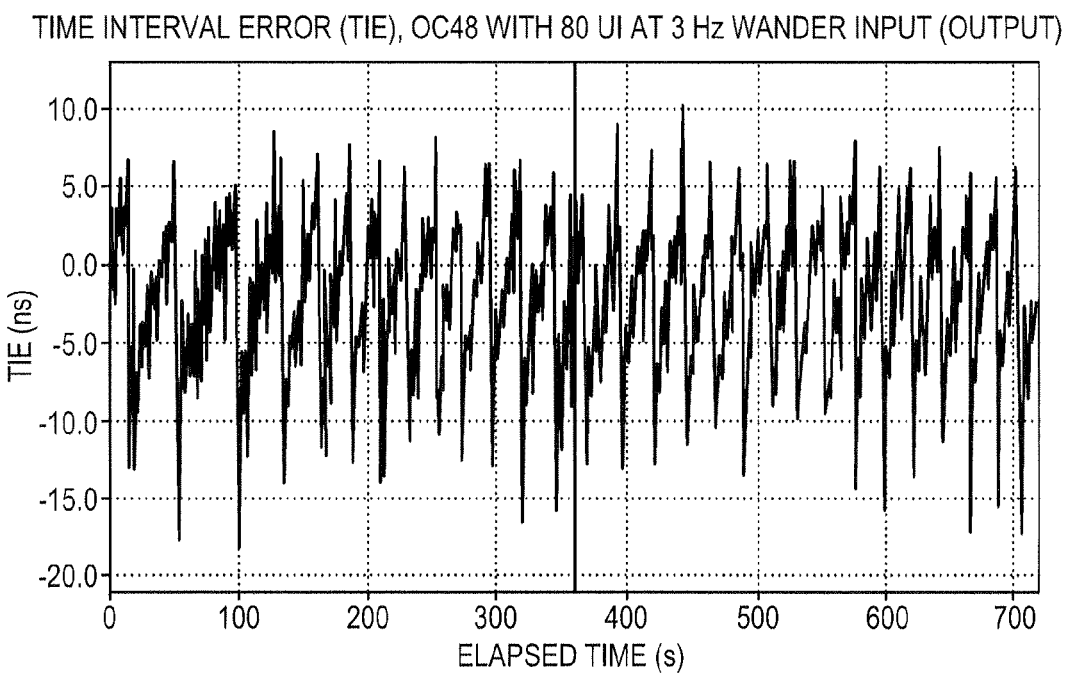
Figure 12A:
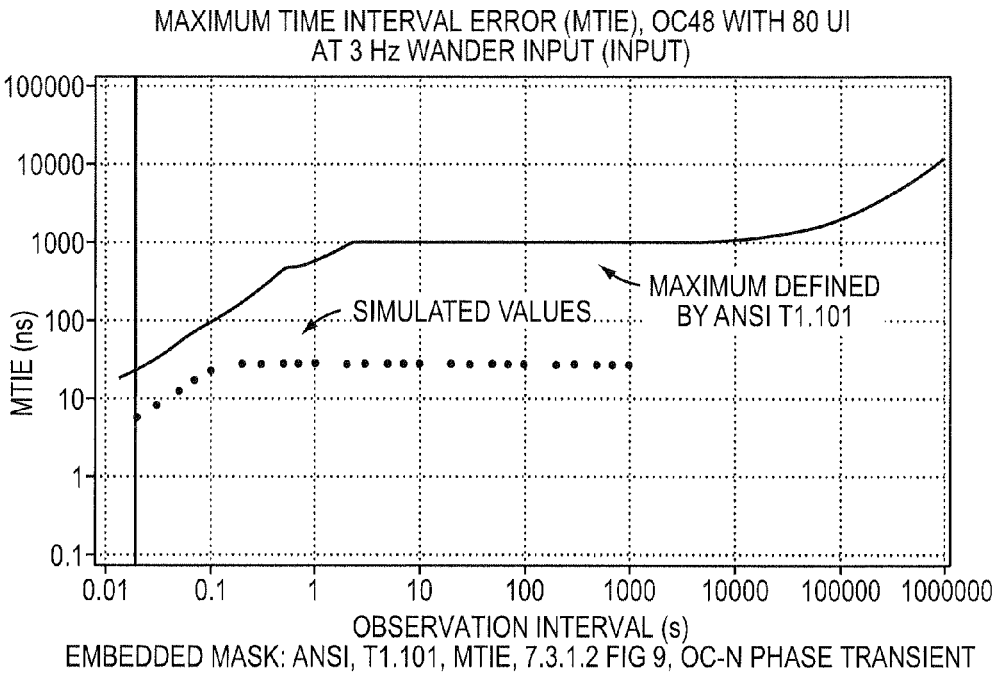
FIGS. 12A-12B are plots of MTIE for an OC48 signal having 80 UI of wander at 3 Hz accepted as an input and generated as an output by an example embodiment of the present invention, respectively.
Figure 12B:
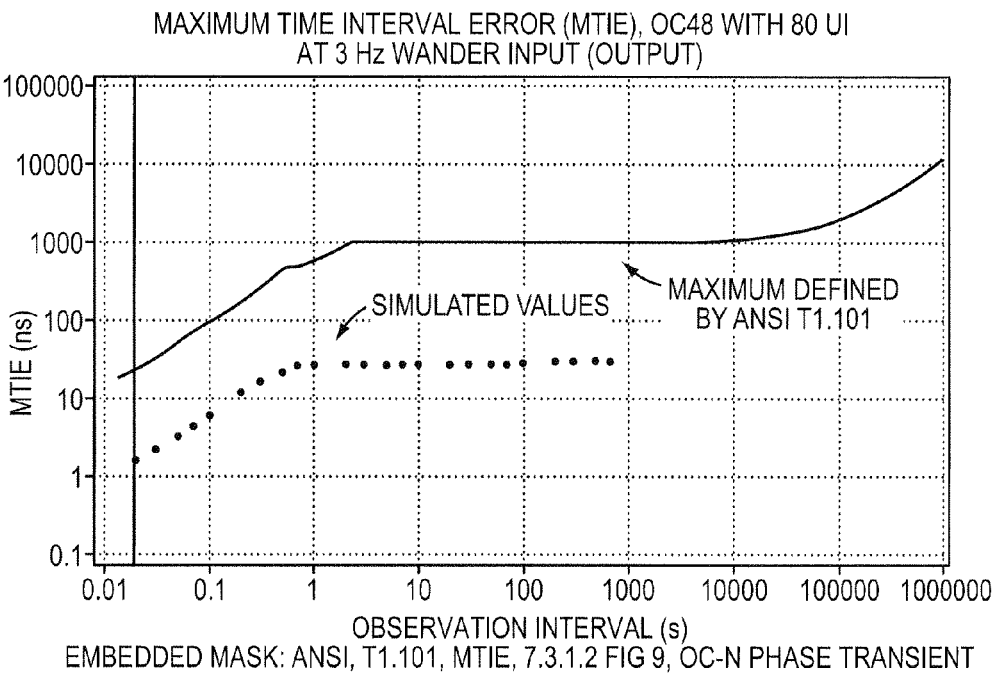
Figure 13A:
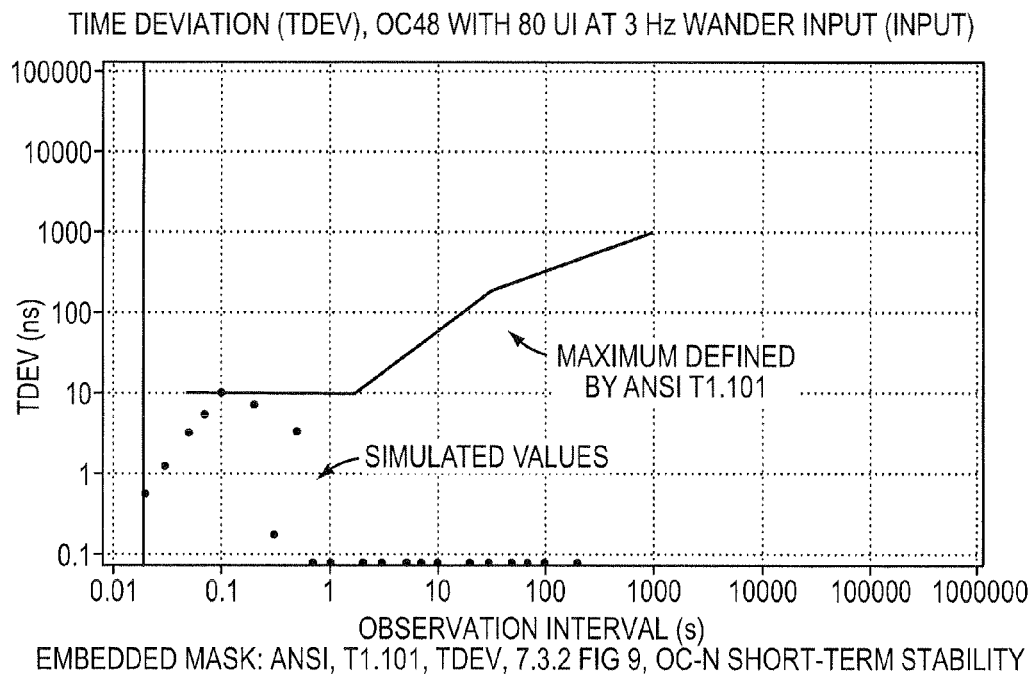
FIGS. 13A-13B are plots of TDEV for an OC48 signal having 80 UI of wander at 3 Hz accepted as an input and generated as an output by an example embodiment of the present invention, respectively.
Figure 13B:
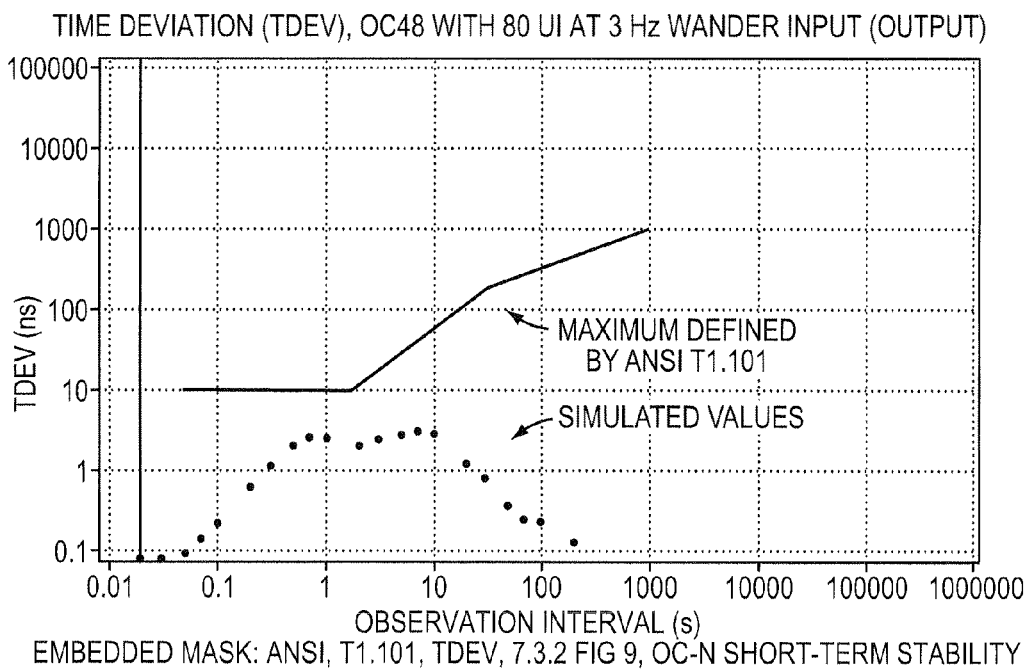

Also, FIGS. 11-13 are respective input and output plots of TIE, MTIE and TDEV accepted and generated by the example embodiment of the present invention for an OC48 signal having 80 Unit Intervals (UI) of wander at a frequency of 3 Hz.

Figure 14A:
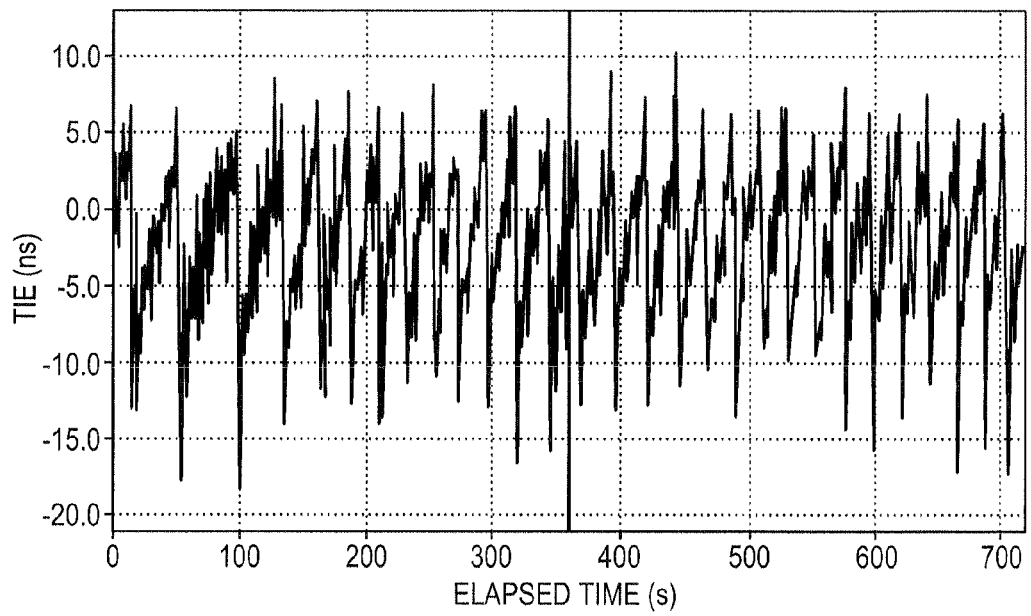
FIGS. 14A-14B are plots of TIE for an OC48 signal having 120 UI of wander at 0.1 Hz accepted as an input and generated as an output by an example embodiment of the present invention, respectively.
Figure 14B:
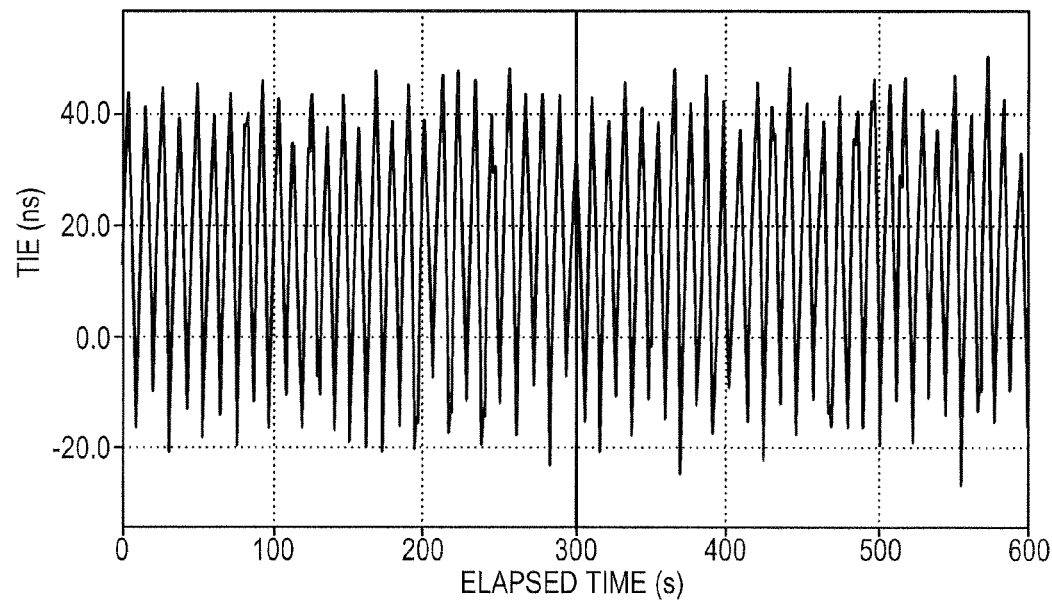
Figure 15A:
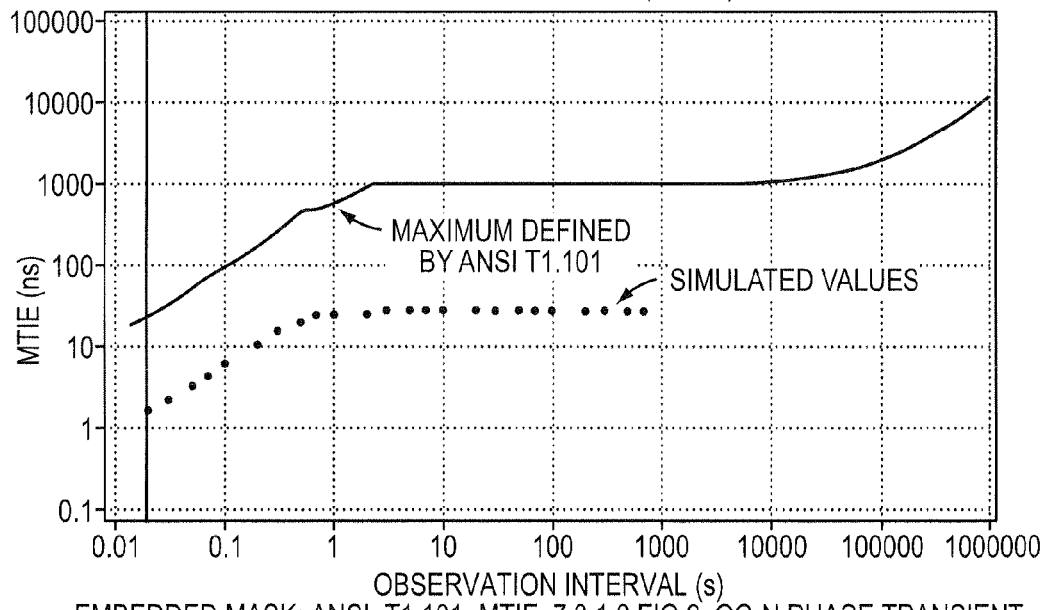
FIGS. 15A-15B are plots of MTIE for an OC48 signal having 120 UI of wander at 0.1 Hz accepted as an input and generated as an output by an example embodiment of the present invention, respectively.
Figure 15B:
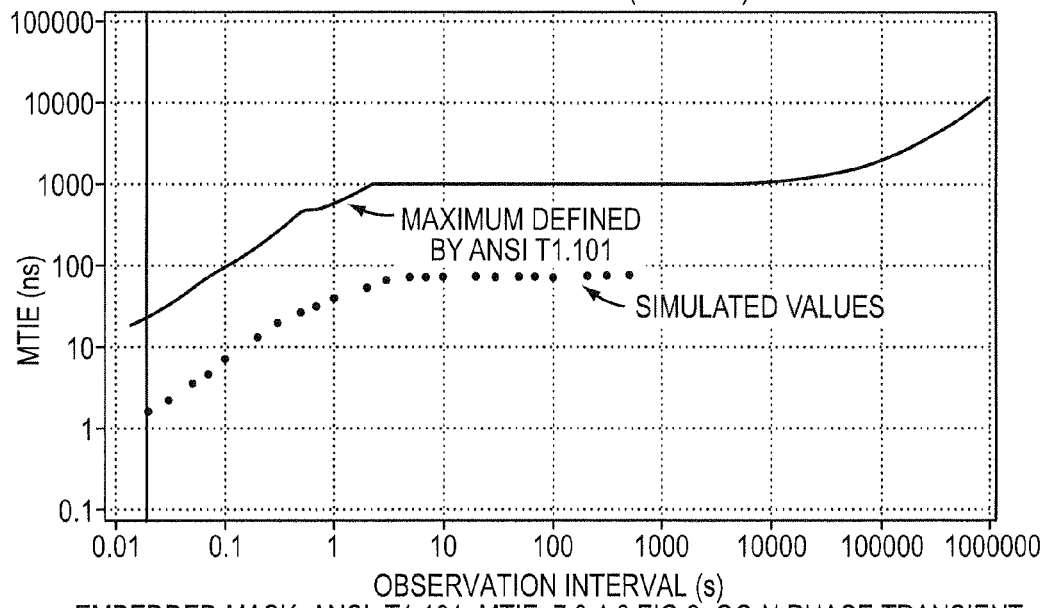
Figure 16A:
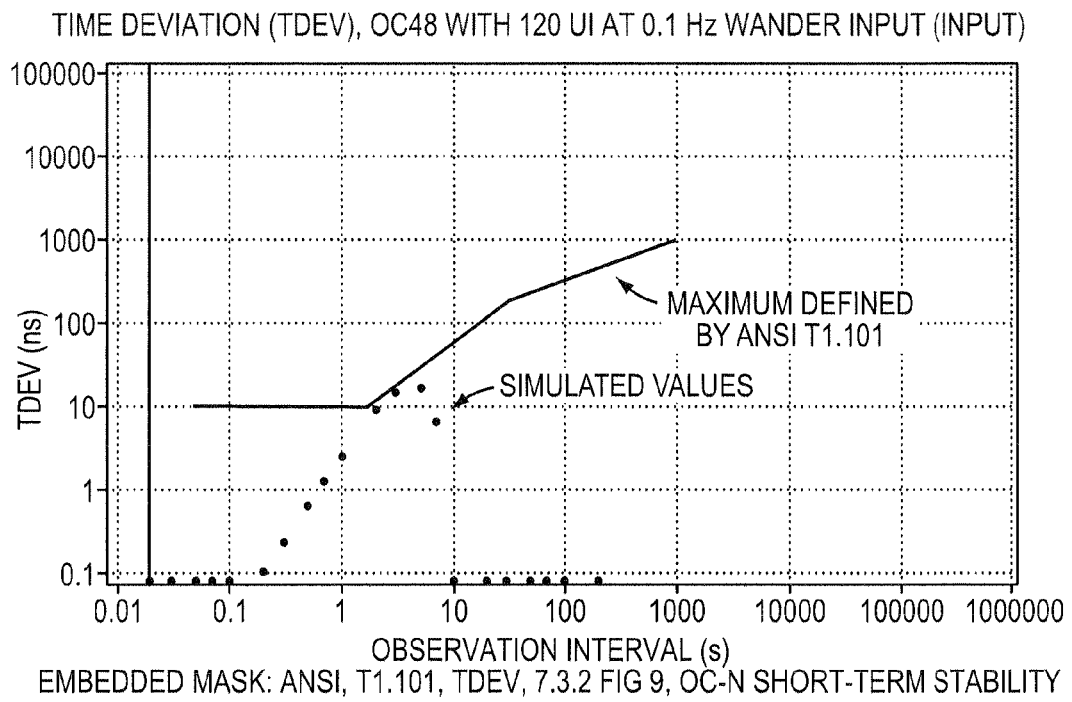
FIGS. 16A-16B are plots of TDEV for an OC48 signal having 120 UI of wander at 0.1 Hz accepted as an input and generated as an output by an example embodiment of the present invention, respectively.
Figure 16B:
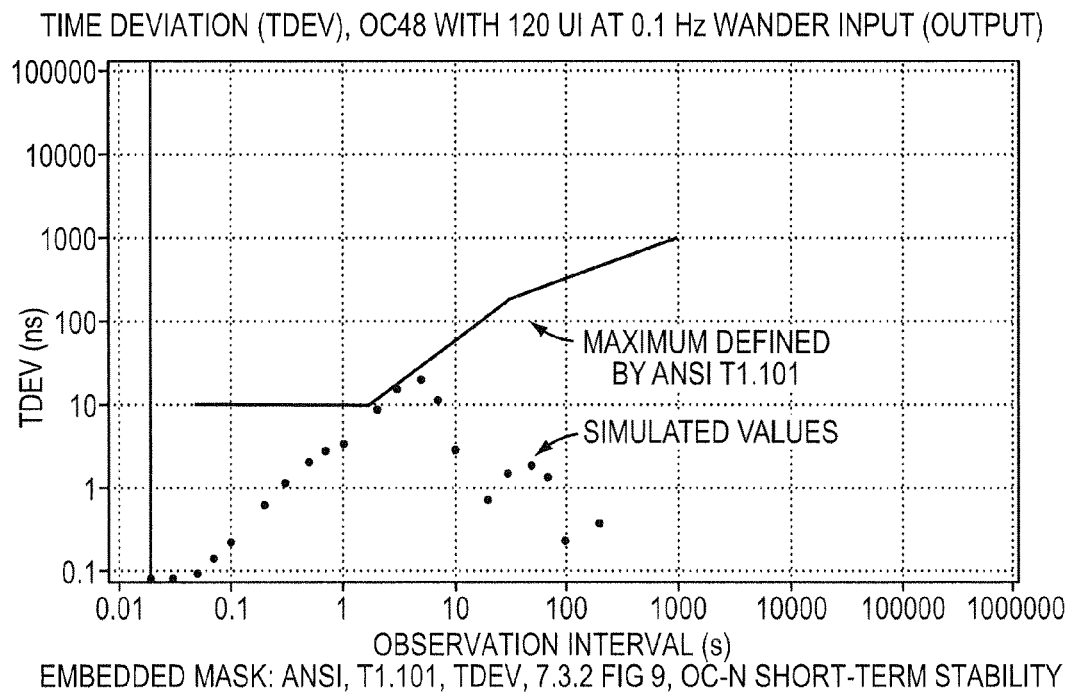

Likewise, FIGS. 14-16 are respective input and output plots of TIE, MTIE and TDEV accepted and generated by the example embodiment of the present invention for an OC48 signal having 120 UI of wander at 0.1 Hz.

Figure 17A:
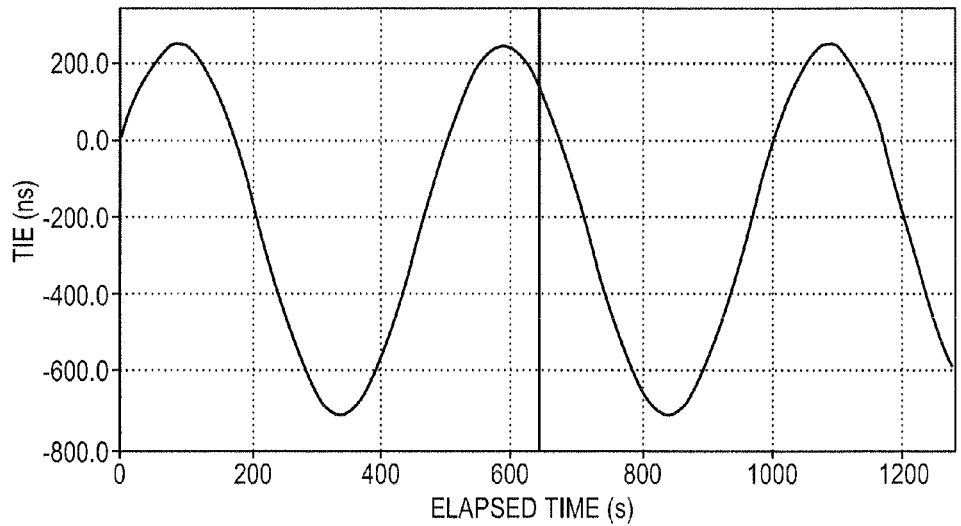
FIGS. 17A-17B are plots of TIE for an OC48 signal having 2400 UI of wander at 2 MHz accepted as an input and generated as an output by an example embodiment of the present invention, respectively.
Figure 17B:
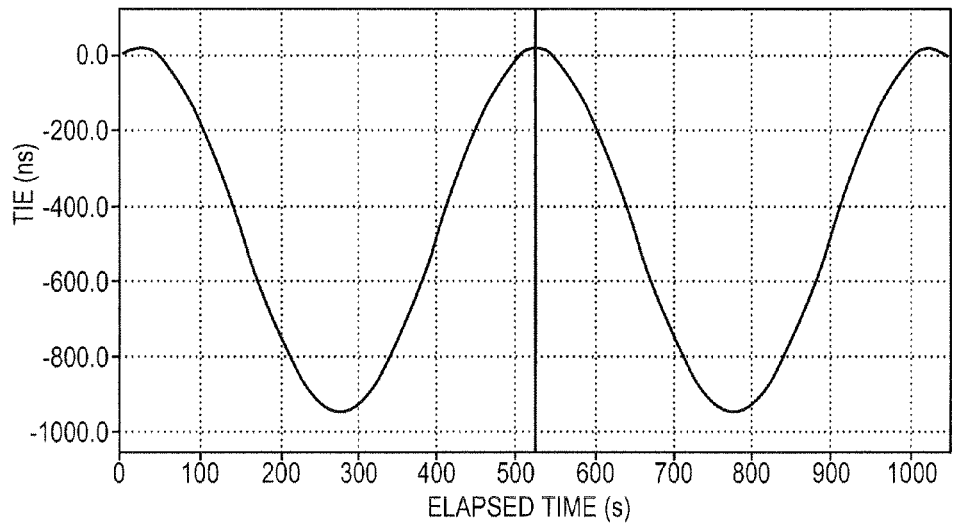
Figure 18A:
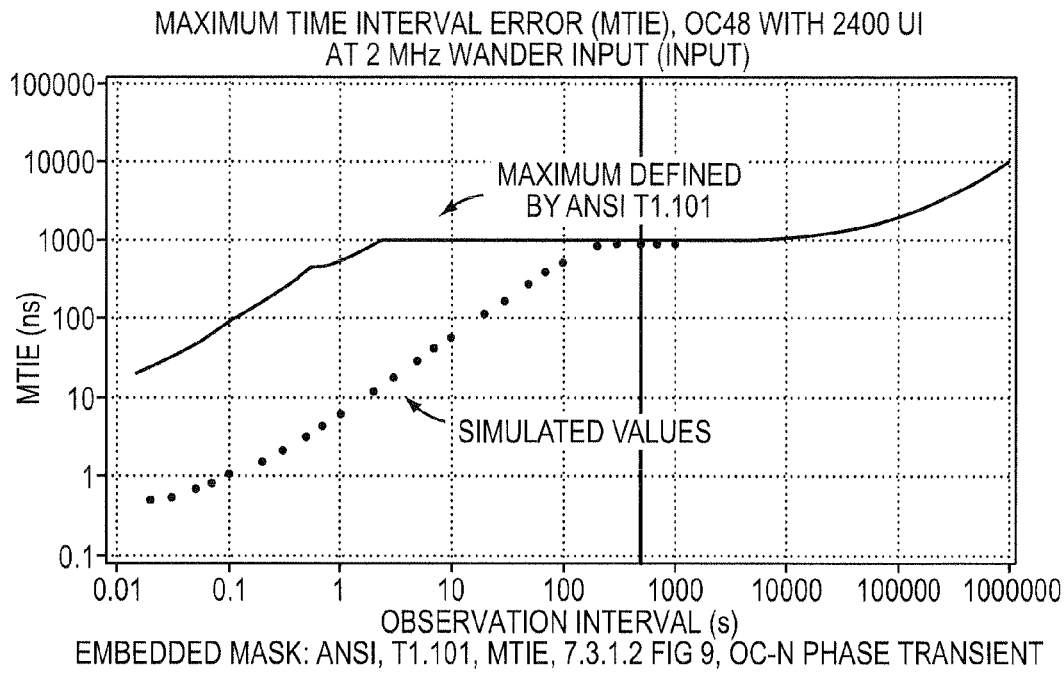
FIGS. 18A-18B are plots of MTIE for an OC48 signal having 2400 UI of wander at 2 MHz accepted as an input and generated as an output by an example embodiment of the present invention, respectively.
Figure 18B:
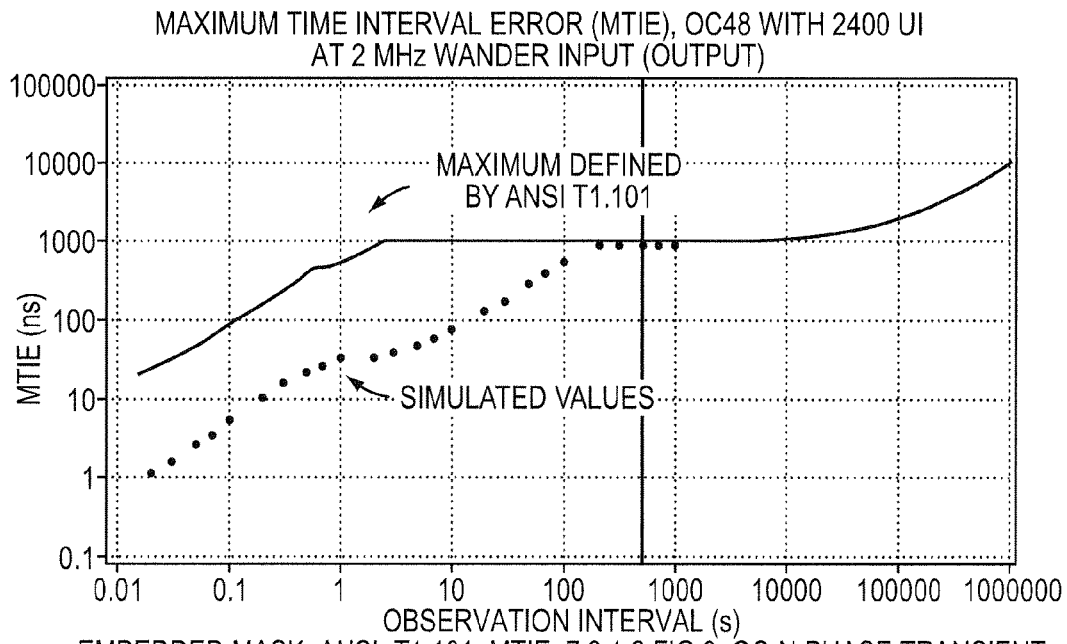
Figure 19A:
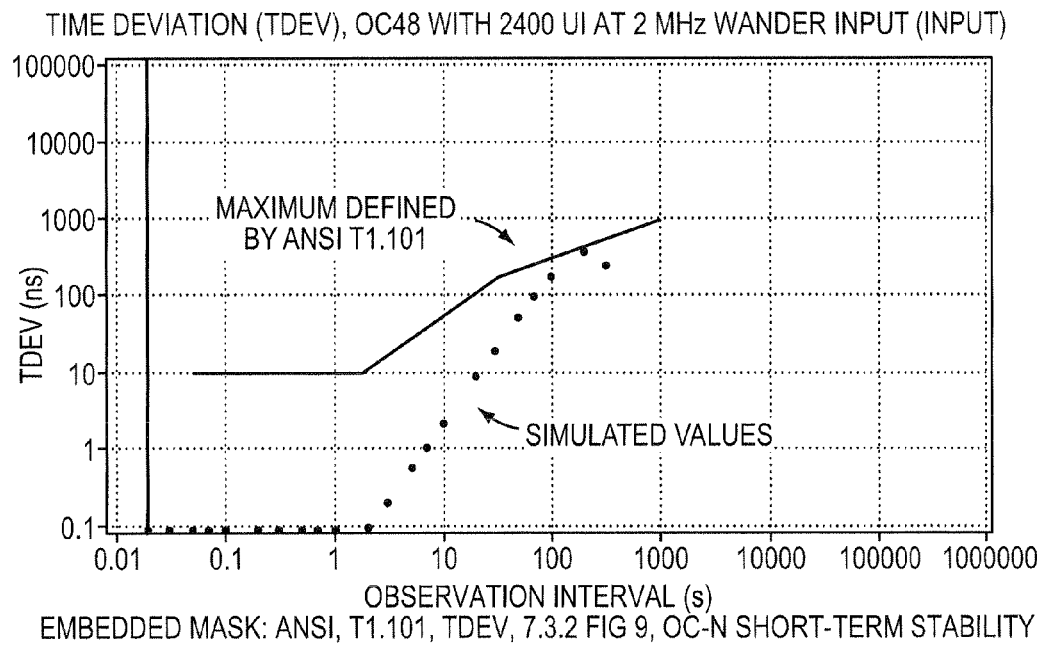
FIGS. 19A-19B are plots of TDEV for an OC48 signal having 2400 UI of wander at 2 MHz accepted as an input and generated as an output by an example embodiment of the present invention, respectively.
Figure 19B:
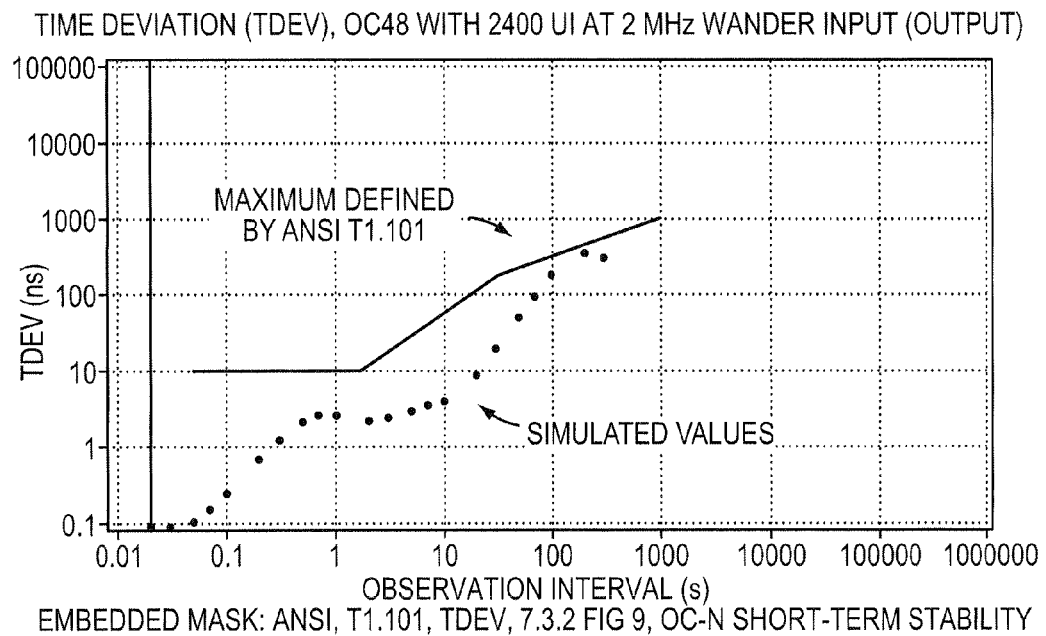

Similarly, FIGS. 17-19 are respective input and output plots of TIE, MTIE and TDEV accepted and generated by the example embodiment of the present invention for an OC 48 signal having 2400 UI of wander at 2 MHz.

It should be understood that the procedure or aspects thereof can be implemented in the form of hardware, firmware, software, or combinations thereof. If implemented in software, the software can be implemented in any language that can perform the example procedures described above. The software can be stored on any computer-readable medium and loaded and executed by processor(s), general or application-specific, that can operate consistent with the example embodiments disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for supporting client data transport with timing transparency, the apparatus comprising:
   memory configured to transfer client data, received in a network transport signal and clocked into the memory at a transport timing domain, from the transport timing domain to a recovered client timing domain;
   a clock recovery loop configured to derive a client data reference clock as a function of a depth indicator of client data in the memory, a clock recovery reference clock, and the client data reference clock, and configured to provide the client data reference clock to the memory to clock out the client data in the recovered client timing domain to support client data transport with timing transparency.

2. The apparatus of claim 1 wherein the memory is a First In First Out (FIFO) memory device.

3. The apparatus of claim 1 wherein the clock recovery loop includes a clock recovery filter configured to produce a clock signal with omitted cycles at a rate calculated to match a client data rate.

4. The apparatus of claim 3 wherein the clock recovery filter is further configured to produce the clock signal with omitted cycles to cause a change of the depth indicator.

5. The apparatus of claim 3 wherein the clock recovery filter further includes a phase-locked loop to produce a smooth clock signal based on the clock signal with omitted cycles and provide the smooth clock signal for use by the memory to clock out the client data and for use by the clock recovery filter to produce the clock signal with omitted cycles.

6. The apparatus of claim 3 wherein the clock recovery filter operates under multiple modes.

7. The apparatus of claim 6 wherein the modes include acquisition and lock modes.

8. The apparatus of claim 1 wherein the clock recovery loop further includes a mode controller configured to change an operating state of the clock recovery loop from a first acquire mode to a second acquire mode or a lock mode as a function of the depth indicator.

9. The apparatus of claim 8 wherein the mode controller changes operating parameters of the clock recovery loop, including a sampling period.

10. The apparatus of claim 1 wherein the clock recovery loop derives the client data reference clock using powers of two.

11. A method for supporting client data transport with timing transparency, the method comprising:
    storing client data in a memory received in a network transport signal and clocked into the memory at a transport timing domain;
    deriving a client data reference clock as a function of a depth indicator of client data in the memory, a clock recovery reference clock, and the client data reference clock; and
    providing the client data reference clock to the memory to clock out the client data in the recovered client timing domain to support client data transport with timing transparency.

12. The method of claim 11 wherein the memory is a First In First Out (FIFO) memory device.

13. The method of claim 11 further comprising producing a clock signal with omitted cycles at a rate calculated to match a client data rate.

14. The method of claim 13 wherein the clock signal with omitted cycles causes a change of the depth indicator.

15. The method of claim 13 further comprising:
producing a smooth clock signal based on the clock signal with omitted cycles; and
providing the smooth clock signal for use by the memory to clock out the client data, and to produce the clock signal with omitted cycles.

16. The method of claim 13 wherein the filter operates under multiple modes.

17. The method of claim 16 wherein the modes include acquisition and lock modes.

18. The method of claim 11 further comprising changing an operating state from a first acquire mode to a second acquire mode or a lock mode as a function of the depth indicator.

19. The method of claim 18 further comprising changing operating parameters, includes sampling period.

20. The method of claim 11 further comprising deriving the client data reference clock using powers of two.

21. An apparatus for supporting client data transport with timing transparency, the apparatus comprising:
memory configured to transfer client data, received in a network transport signal and clocked into the memory at a transport timing domain, from the transport timing domain to a recovered client timing domain;
means for deriving a client data reference clock as a function of a depth indicator of client data in the memory, a clock recovery reference clock, and the client data reference clock; and
means for providing the client data reference clock to the memory to clock out the client data in the recovered client timing domain to support client data transport with timing transparency.

22. A transport node for supporting client data transport with timing transparency, the transport node comprising:
memory configured to transfer client data, received in a network transport signal and clocked into the memory at a transport timing domain, from the transport timing domain to a recovered client timing domain;
a clock recovery loop configured to derive a client data reference clock as a function of a depth indicator of client data in the memory, a clock recovery reference clock, and the client data reference clock, and configured to provide the client data reference clock to the memory to clock out the client data in the recovered client timing domain to support client data transport with timing transparency.

* * * * *